US009062836B2

(12) United States Patent
Tran et al.

(10) Patent No.: US 9,062,836 B2
(45) Date of Patent: Jun. 23, 2015

(54) CASSETTE FOR RECEIVING A PLANAR LIGHT SOURCE

(75) Inventors: Michael Trung Tran, Oakland, CA (US); Aaron Mathew Engel-Hall, San Francisco, CA (US); Darren Blum, San Mateo, CA (US)

(73) Assignee: ABL IP Holding, LLC, Conyers, GA (US)

( * ) Notice: Subject to any disclaimer, the term of this patent is extended or adjusted under 35 U.S.C. 154(b) by 185 days.

(21) Appl. No.: 13/461,657

(22) Filed: May 1, 2012

(65) Prior Publication Data
US 2012/0294016 A1 Nov. 22, 2012

Related U.S. Application Data

(60) Provisional application No. 61/486,698, filed on May 16, 2011.

(51) Int. Cl.
| F21V 19/00 | (2006.01) |
| F21S 2/00 | (2006.01) |
| F21S 8/06 | (2006.01) |
| F21V 21/005 | (2006.01) |
| F21Y 105/00 | (2006.01) |

(52) U.S. Cl.
CPC .............. F21S 2/005 (2013.01); F21S 8/061 (2013.01); F21V 21/005 (2013.01); *F21Y 2105/008* (2013.01); *Y02B 20/36* (2013.01)

(58) Field of Classification Search
CPC .............. G09F 15/0018; G09F 13/18; F21Y 2105/006; F21Y 2106/008; F21V 19/003; F21V 19/0035; F21V 19/0045
See application file for complete search history.

(56) References Cited

U.S. PATENT DOCUMENTS

| 208,681 | A | * | 10/1878 | Hale | 40/793 |
| 1,832,265 | A | * | 11/1931 | Tague | 40/792 |
| 2,920,407 | A | * | 1/1960 | Stathem | 40/658 |
| 3,980,875 | A | * | 9/1976 | Cote | 362/15 |
| 4,864,473 | A | * | 9/1989 | Tokarz | 362/490 |
| 5,017,146 | A | * | 5/1991 | Uehara et al. | 439/65 |
| 5,075,831 | A | | 12/1991 | Stringer et al. | |
| 5,335,434 | A | * | 8/1994 | Shultz et al. | 40/766 |
| 5,779,346 | A | | 7/1998 | Burke | 362/84 |
| 5,780,965 | A | * | 7/1998 | Cass et al. | 313/506 |
| 5,964,516 | A | * | 10/1999 | Lai | 362/95 |
| 6,124,672 | A | * | 9/2000 | Burke | 313/506 |
| 6,170,958 | B1 | * | 1/2001 | Chien | 362/84 |
| 6,203,173 | B1 | | 3/2001 | Duff et al. | |
| 6,381,889 | B1 | | 5/2002 | Knapp | |
| 6,608,253 | B1 | * | 8/2003 | Rintz | 174/66 |
| 6,776,496 | B2 | * | 8/2004 | Cok | 362/84 |
| 6,832,845 | B1 | | 12/2004 | Kretzschmar et al. | |
| 6,896,391 | B2 | | 5/2005 | Kotovsky et al. | |
| 7,153,008 | B2 | * | 12/2006 | Grote et al. | 362/487 |

(Continued)

FOREIGN PATENT DOCUMENTS

WO WO/2012/158725 11/2012

*Primary Examiner* — Ismael Negron
(74) *Attorney, Agent, or Firm* — Beeson Skinner Beverly, LLP

(57) ABSTRACT

A cassette includes a substantially planar base plate having a first or bottom side and a second or top side. A slide channel capture ring or other retention structure is provided on the first side of the base plate for releasably retaining a planar light source to this side of the base plate. Another slide pocket, or other slide-in retention structure is provided on the second side of the base plate for coupling the cassette to a connector structure.

26 Claims, 28 Drawing Sheets

(56) References Cited

U.S. PATENT DOCUMENTS

| | | |
|---|---|---|
| 7,214,105 B1 | 5/2007 | Trerotola |
| 7,344,296 B2 * | 3/2008 | Matsui et al. ............... 362/652 |
| 7,703,941 B2 * | 4/2010 | Lee ............................. 362/219 |
| 8,142,065 B2 * | 3/2012 | Cho et al. .................... 362/646 |
| 8,215,787 B2 * | 7/2012 | Mathai et al. ............... 362/147 |
| 8,231,261 B2 * | 7/2012 | Gherardini et al. ......... 362/647 |
| 8,511,843 B2 * | 8/2013 | Hofmann et al. ............. 362/84 |
| 2007/0279908 A1 | 12/2007 | Alcelik |
| 2010/0284185 A1 | 11/2010 | Ngai |
| 2011/0063587 A1 | 3/2011 | Chien |
| 2011/0095701 A1 | 4/2011 | Tanahashi et al. |
| 2011/0176308 A1 * | 7/2011 | Wu et al. ..................... 362/247 |
| 2013/0329438 A1 * | 12/2013 | Wakahara et al. ........... 362/396 |

\* cited by examiner

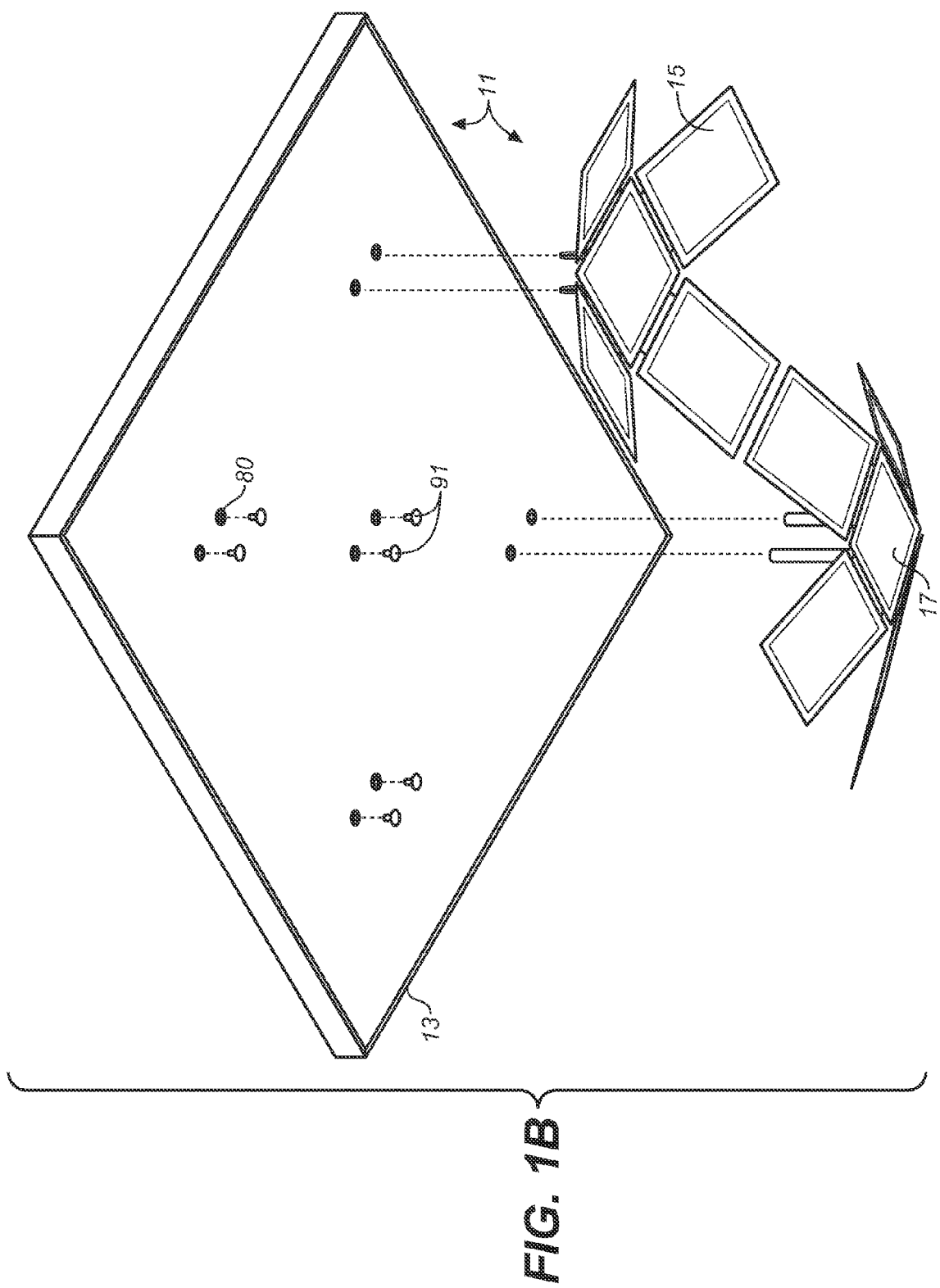

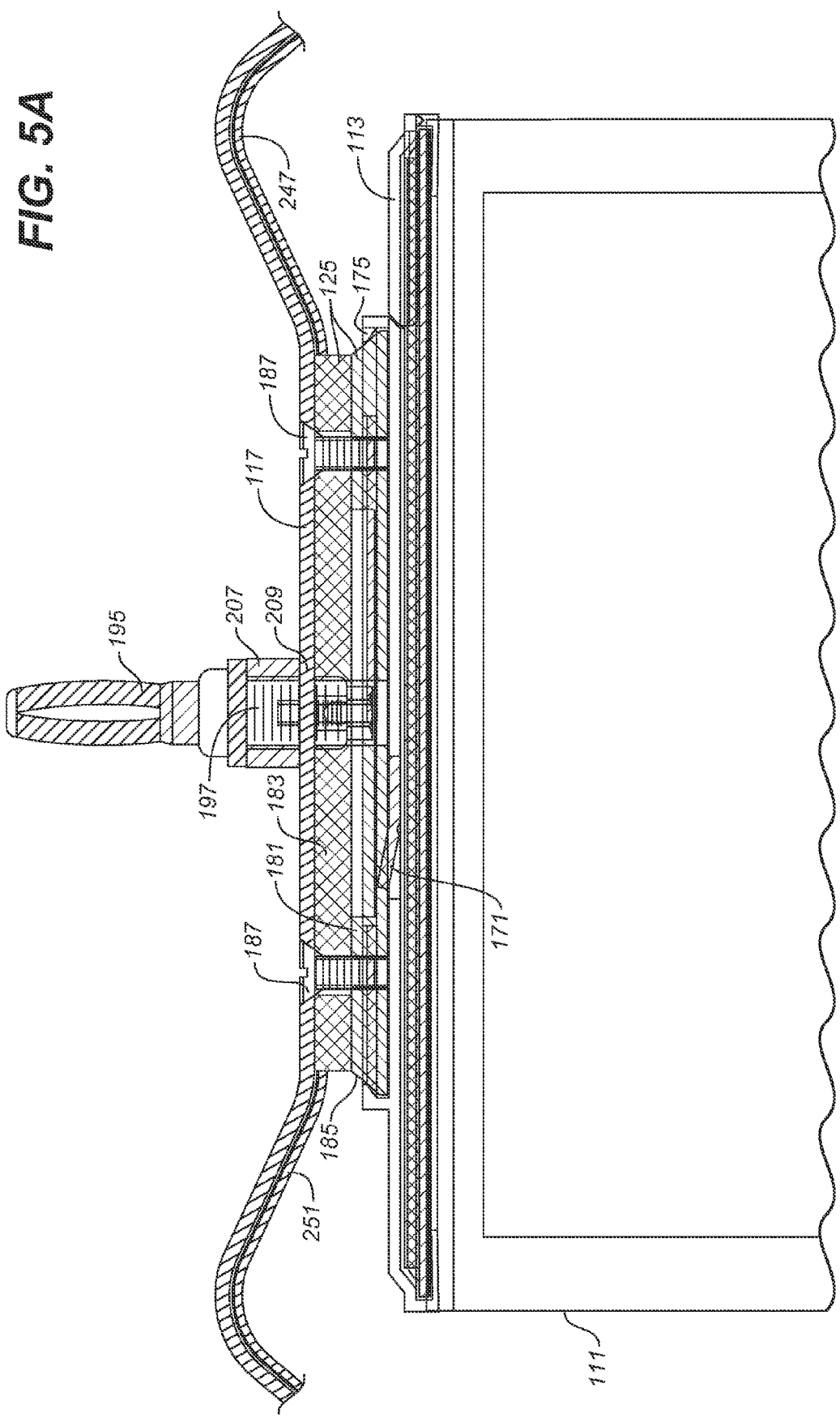

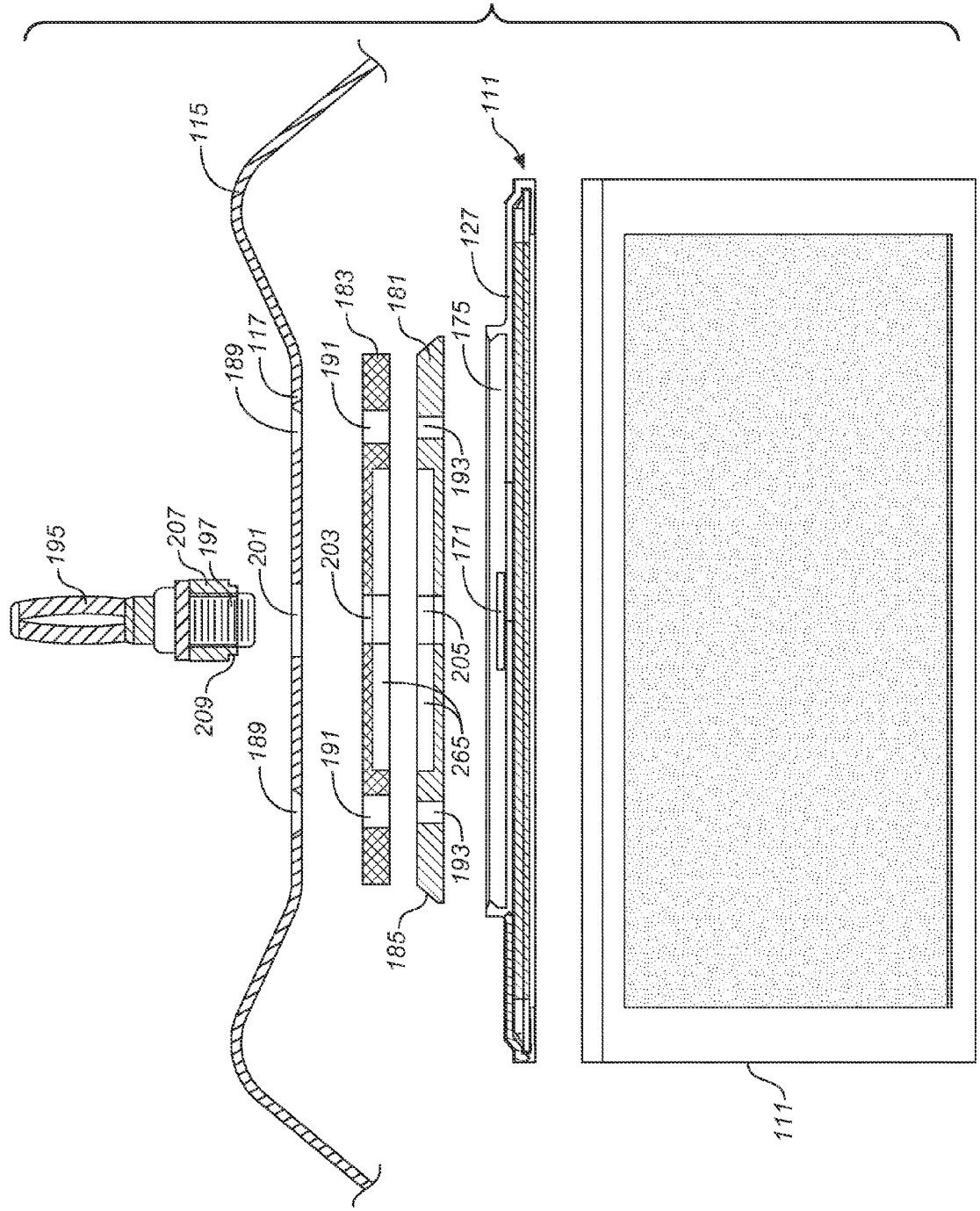

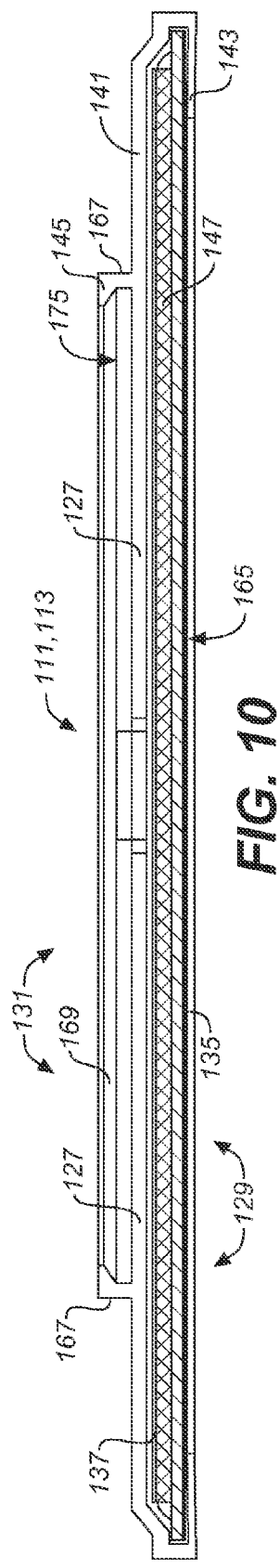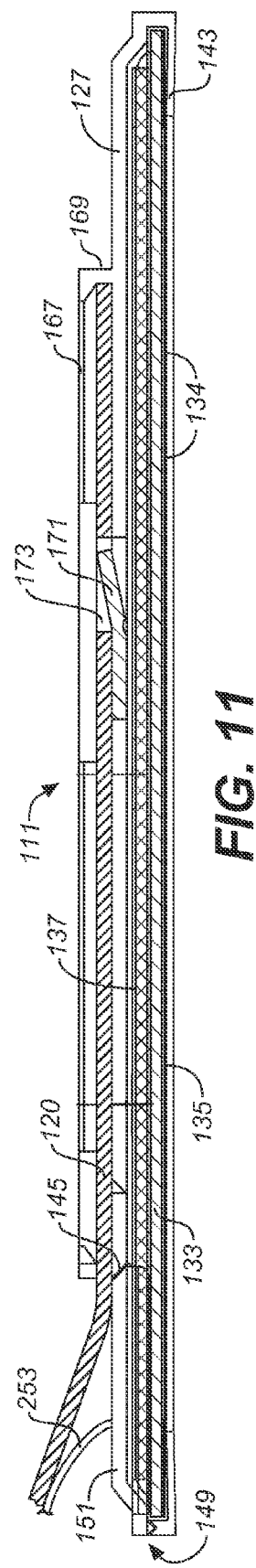

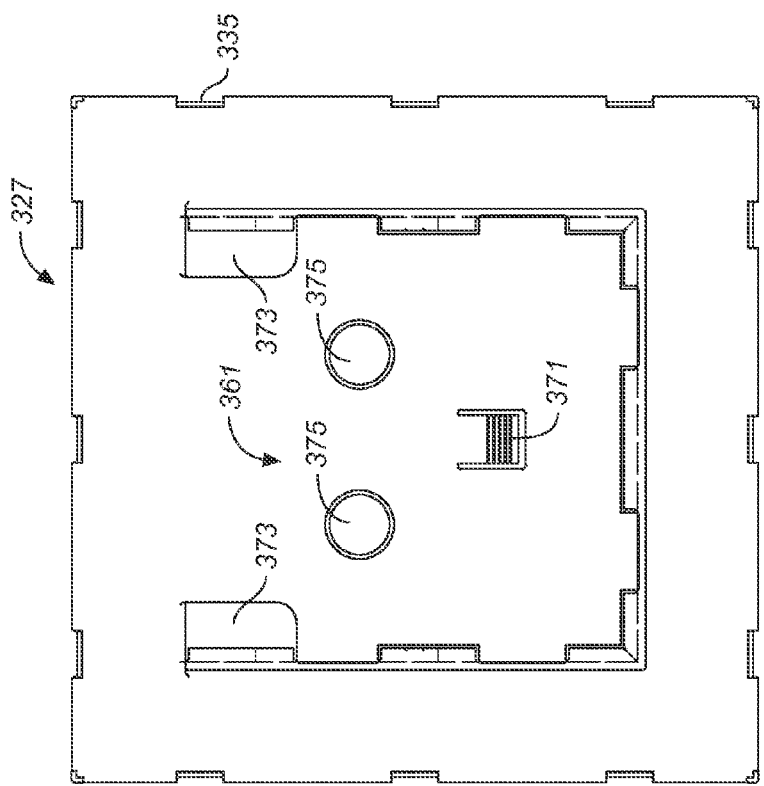
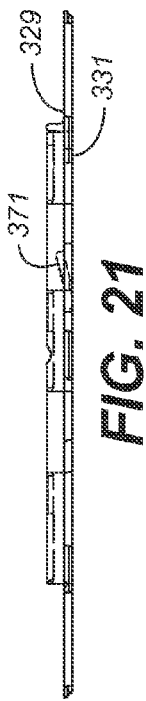
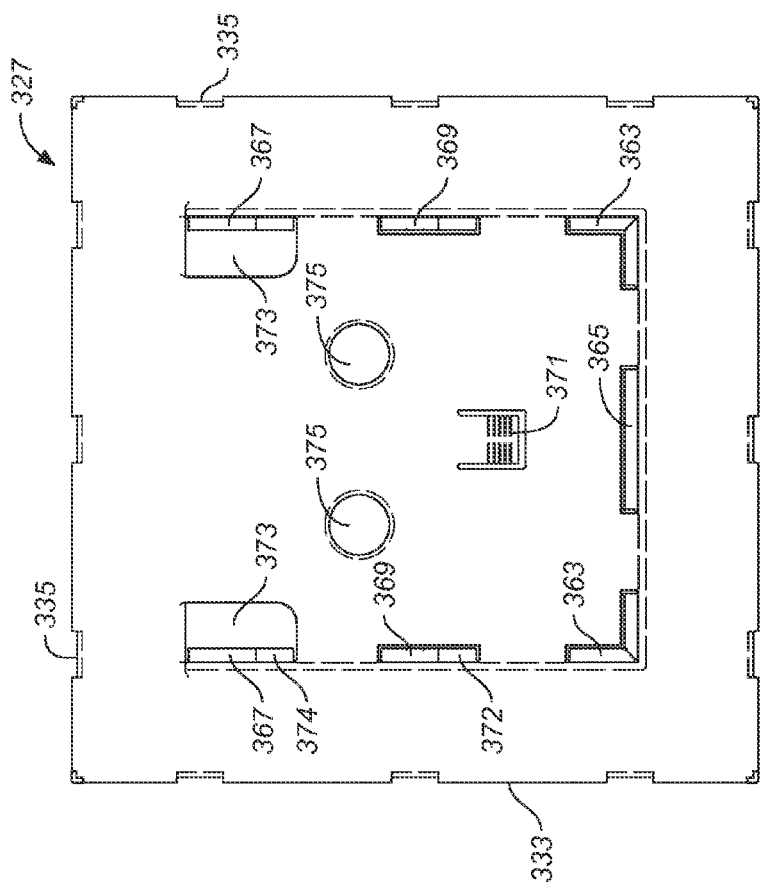
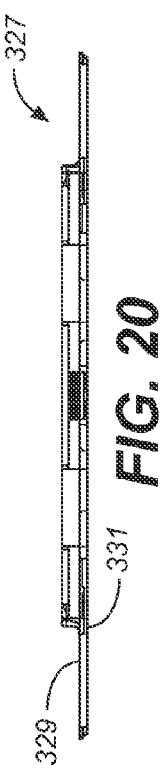
FIG. 18
FIG. 19
FIG. 20
FIG. 21

CASSETTE FOR RECEIVING A PLANAR LIGHT SOURCE

CROSS-REFERENCE TO RELATED APPLICATIONS

This Application Claims the benefit of U.S. Provisional Application No. 61/486,698 filed May 16, 2011, which is incorporated herein by reference.

BACKGROUND OF INVENTION

The present invention generally relates to lighting systems and more particularly to means for operatively attaching flat panel light sources to luminaires or lighting systems.

Flat panel light sources, such as Organic Light Emitting Diodes (OLEDs), are energy efficient light sources that have potential applications in luminaire and lighting system design. These light sources are characterized by extremely thin profiles, light emitting surfaces that can produce diffuse light, that is, light that is emitted in a lambertian distribution pattern, and luminous surfaces that exhibit relatively low brightness. Despite the advantages of using planar light sources and particularly OLEDs, for general lighting applications, they present challenges for lighting designers. Unlike conventional light sources, such as incandescent bulbs or fluorescent tubes that can easily be plugged into compatible lamp sockets mounted in a luminaire, OLEDs are relatively difficult to integrate into the structural environment of the luminaire or lighting system, and relatively difficult to remove and replace. OLEDs are often mounted directly to structure components of an OLED luminaire or lighting system and wired in place.

The present invention greatly simplifies the handling of flat planar light sources, such as OLEDs, and allows for easier mechanical attachment of such sources to a luminaire or lighting system and for easier electrical connection of such light sources when the mechanical attachment is made. The present invention also allows for the incorporation of OLEDs into luminaire or lighting system structures in a manner that is compatible with low profile components and that is aesthetically pleasing.

SUMMARY OF INVENTION

The invention is directed to a means for mechanically holding a thin panel light source, such as an OLED panel, in a manner that allows the OLED panel to be easily connected to a luminaire or lighting system. The invention also allows the OLED panels to be electrically connected to the luminaire or lighting system either after or as it is mechanically attached to the luminaire or lighting system.

More particularly, the invention involves a loadable cassette for operatively holding a planar light source, such as an OLED panel to a structure that is part of a luminaire or lighting system, and which preferably has a low profile. The cassette is designed to allow for the electrical connection of the panel light source to the luminaire or lighting system. In one aspect of the invention, the electrical connection is made after the cassette loaded with a panel light source is mechanically attached to the luminaire or lighting system. In another aspect of the invention the electrical connection is made automatically as the mechanical connection is made.

The cassette is comprised of a substantially planar base plate having a first side and a second side. A planar light source retention means is provided on the first side of said base plate for releasably retaining a planar light source to this side of the base plate. Another retention means is provided on the second side of said base plate for receiving and holding the cassette to a connector structure, which can be part of a luminaire or lighting system, or which can be an adaptor structure for making a mechanical connection to a luminaire or lighting system. Preferably, this retention means is a low profile retention means for receiving and mechanically holding the cassette to a substantially flat, low profile connector structure. However, a retention means for the connector structure other than a low profile retention means is considered within the scope of the invention.

The retention means provided on the second side of said base plate for a connector structure is preferably provided in the form of a low profile slide pocket which receives a thin, substantially flat connector structure, wherein the mechanical attachment of connector structures to the cassette base plate is made by a slide-in motion. In a further aspect of the invention the base plate is provided with a released spring tab to releasably lock the connector structure to the base plate when the slide-in motion is made.

The retention means for the planar light source, such as an OLED panel, is preferably designed to hold the planar source flat against or in close parallel relationship to the base plate when a planar light source is loaded into the cassette. In one aspect of the invention, the retention means for the planar light source is provided in the form of a side entry slide pocket on the second or bottom side of the cassette's base plate for slidably receiving an OLED panel. In another aspect of the invention the retention means for the planar light source is provided in the form of a capture ring that can snap or otherwise attach to the first side of the base plate over the planar light source, so as to hold the planar light source against the base plate.

Other and separate aspects of the invention will be apparent for the following description and accompanying drawings.

DESCRIPTION OF DRAWINGS

FIG. 1B is an exploded bottom perspective view thereof showing the light modules exploded away from the driver panel.

FIG. 5A is an enlarged fragmentary cross-sectional view thereof as indicated by dashed line 5A in FIG. 5.

FIG. 5C is an enlarged exploded cross-sectional view thereof.

FIG. 10 is a cross-sectional view of the OLED cassette shown in FIG. 9C (with an OLED panel loaded therein) taken along lines 10-10 in FIG. 9C.

FIG. 11 is a cross-sectional view of the OLED cassette shown in FIG. 9C (again with an OLED panel loaded therein) taken along lines 11-11 in FIG. 9C. FIG. 11 additionally shows one of the radial arms of the light module's spider bracket inserted in the spider bracket retention means of the base plate.

FIG. 18 is a bottom plan view thereof.

FIG. 19 is a top plan view thereof.

FIG. 20 is a front elevational view thereof.

FIG. 21 is a side elevational view thereof.

FIG. 31 is a top plan view of an adaptor plate that can be used to mechanically and electrically attach an OLED loaded cassette such as shown in FIGS. 16-27 to wire containing mounting structures, such as rails or the like.

DETAILED DESCRIPTION OF ILLUSTRATED EMBODIMENTS

Figure 1A:
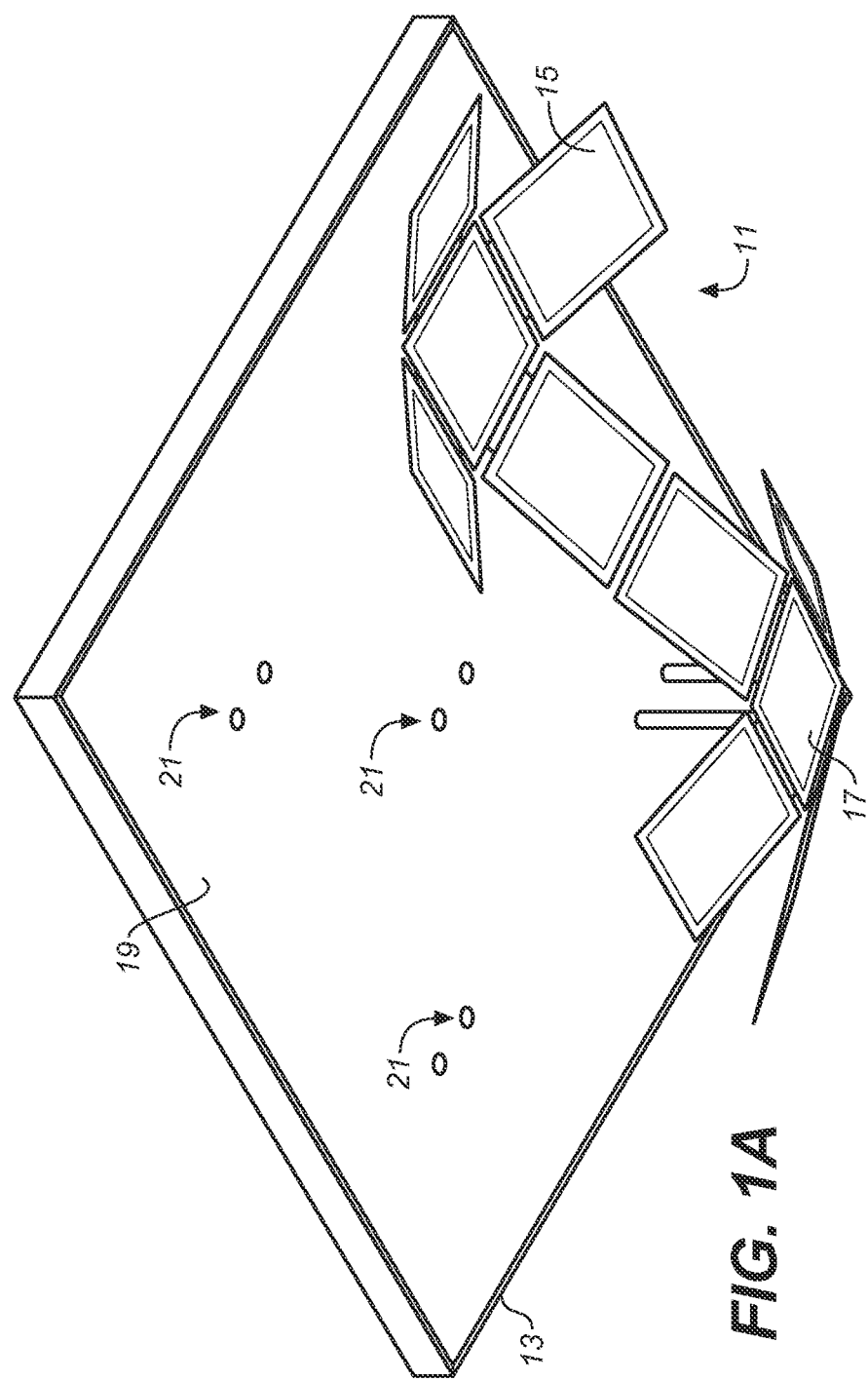
FIG. 1A is a bottom perspective view of elements of a configurable ceiling lighting system which includes two light modules, each of which uses loadable cassettes in accordance with the invention.
Figure 2:
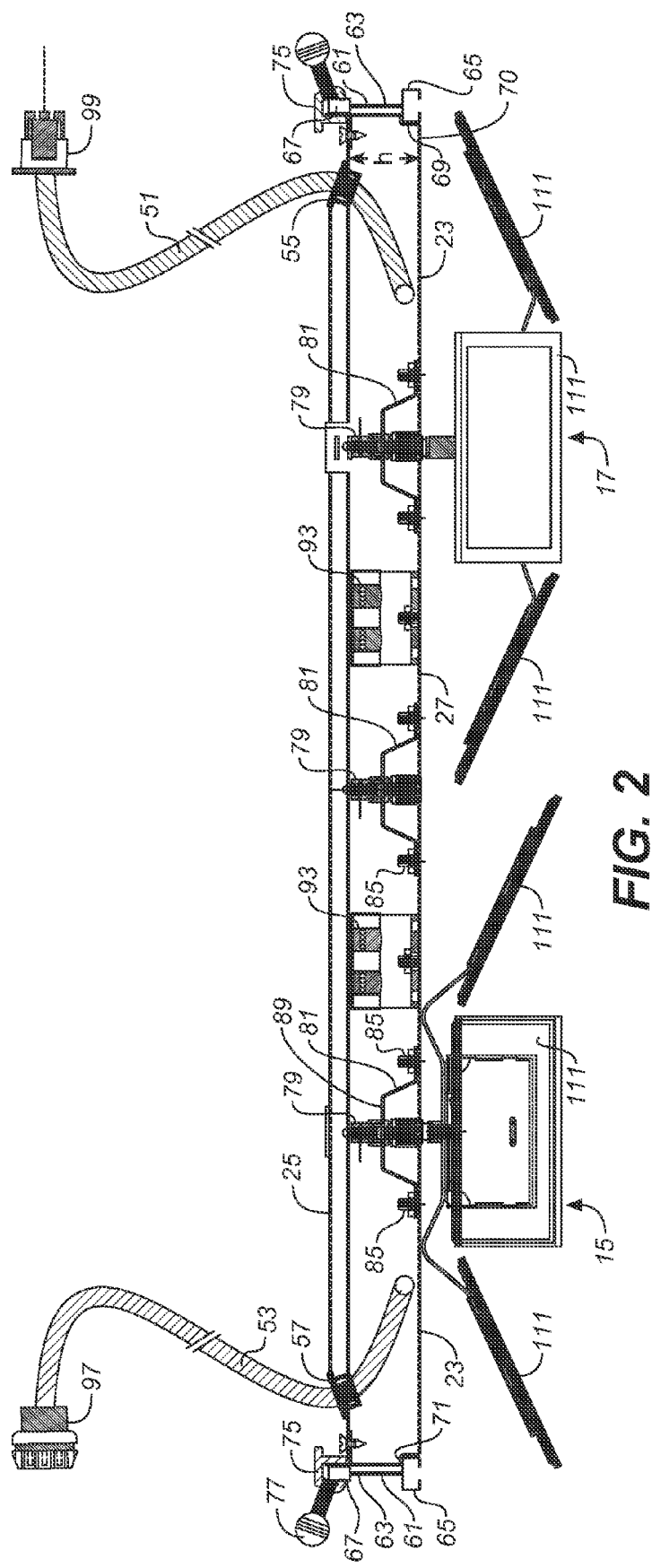
FIG. 2 is a cross-sectional view of the light modules shown in FIGS. 1A and 1B connected to a driver panel of a grid ceiling system.
Figure 3:
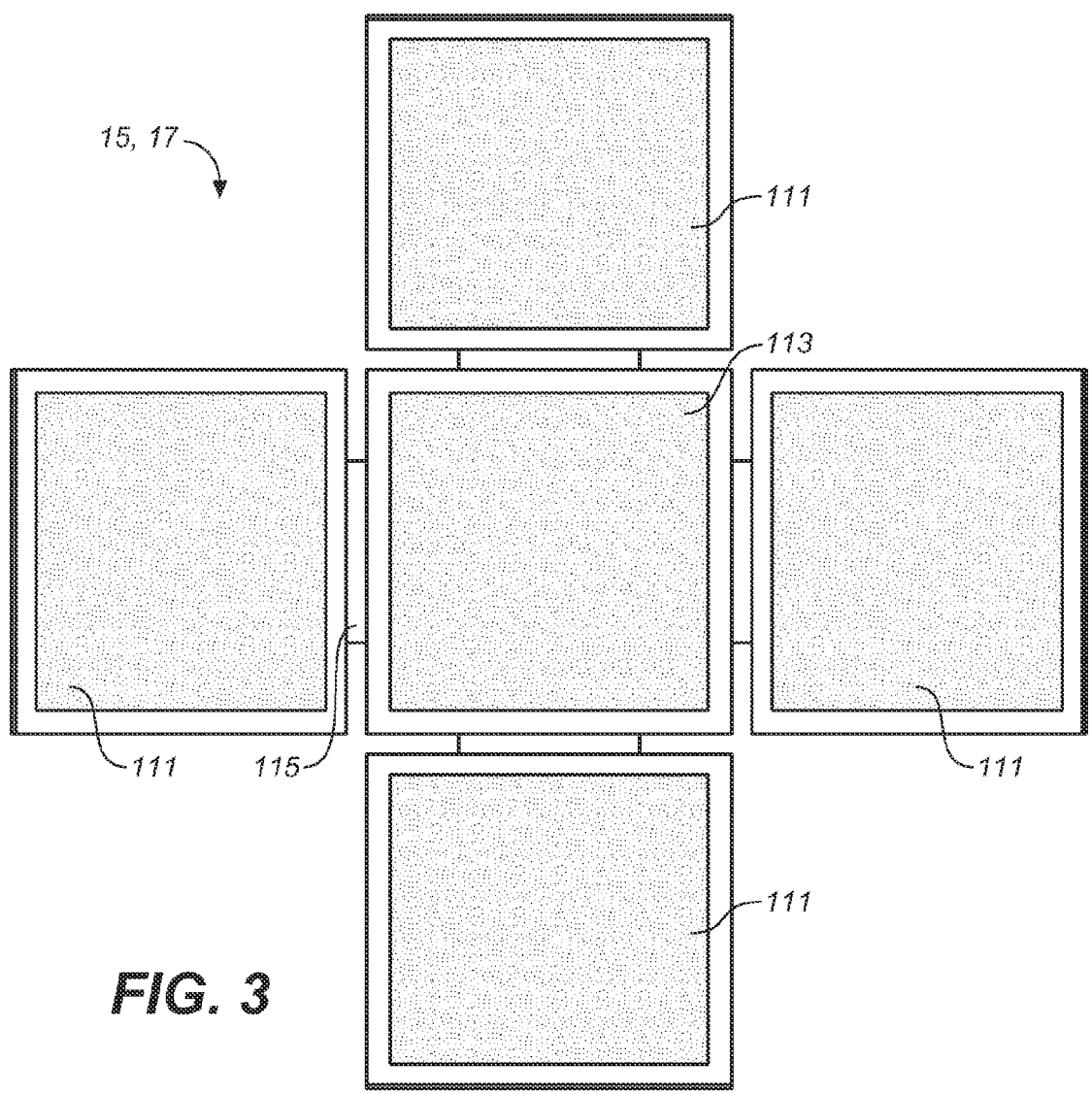
FIG. 3 is a bottom plan view of one of the light modules shown in the foregoing figures.
Figure 4:
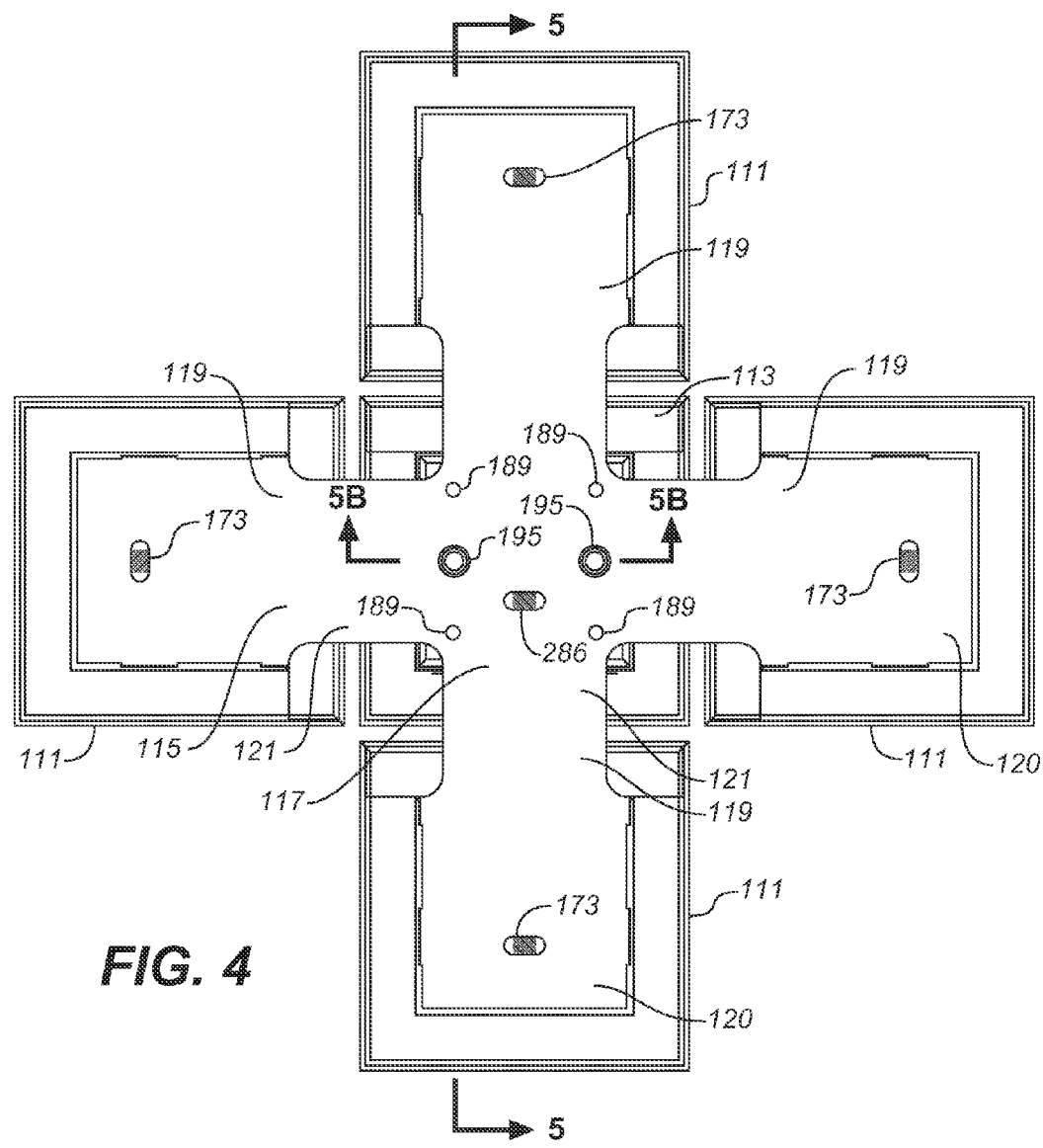
FIG. 4 is top plan view of the light module shown in FIG. 3.

Referring now to the drawings, FIGS. 1A, 1B and 2 show the basic elements of a configurable ceiling lighting system of the type that would employ a loadable cassette in accordance with the invention. The configurable ceiling lighting system 11 includes at least one and suitably a plurality of ceiling driver panels 13, each preferably having a planar low profile form factor, and at least one and preferably a plurality of light modules 15, 17 that can be removably connected to the driver panels. Each driver panel provides a driver panel that fits within the grid framework of a grid ceiling system as hereinafter described and becomes part of the grid ceiling. Each has a bottom with an exposed bottom surface 19 which can simulate a ceiling tile of a grid ceiling system, but which could be provided with a wide variety of surface characteristics, including surface treatments for particular desired aesthetic effects. And each ceiling driver panel has at least one and preferably more than one electrical connector means 21 on its bottom surface to which the light modules 15, 17 can be operatively connected. Each connector means of each driver panel provides a selectable connection point on the ceiling at which a light module can be positioned for creating a ceiling lighting system that meets the particular lighting needs for the space below the ceiling. The light modules are preferably light in weight and compact with a small foot print, and have a connector means complementary to the connector means on the driver panels that provide for ease of installation on any driver panel at any chosen connection point on the driver panel. A light module utilizing Organic Light Emitting Diodes (OLEDs) can advantageously be used as light sources for such modules. An OLED light module and loadable cassettes in accordance with the invention are hereinafter described for use in configurable ceiling lighting systems.

FIG. 2 generally illustrates how the driver panels 13 shown in FIGS. 1A and 1B can securely fit within the grid openings of a grid ceiling and held in place to the T-bars of the grid ceiling. Shown are two opposite and parallel T-bars 61, each having a vertical wall 63, a laterally extending cross-foot 65 at the bottom of the vertical wall, and an enlarged top rail 67 at the top of the vertical wall. The perimeter height, "h", of the driver panel is seen to be smaller than the height of the T-bar, roughly extending from the bottom of its cross-foot 65 to the bottom of its top rail 67. An inward step 69 along the bottom edges 70 of the driver panel box 23 provides a shoulder surface 71 that can rest on the box-shaped cross-foot of the T-bar type shown in FIG. 2, while allowing the bottom wall 27 of the driver panel to lie in a plane substantially flush with the bottom of the T-bars and other panel elements of the grid ceiling. With other types of T-bars, for example, ones having a longer flat cross-foot instead a short box-shaped cross-foot as shown, the cross-foot would support the panel by extending under the panel's bottom wall 27.

The edge-to-edge dimensions of the driver panel will preferably be slightly less than the T-bar-to-T-bar spacing of the ceiling's T-bar grid, leaving a small gap between the panel's perimeter side walls 29 and the vertical walls 63 of the T-bar. To provide positive engagement between the sides of the panel and the T-bars vertical wall, the vertical wall of the panel box can be provided with spring detents (not shown) that press against the T-bars when the panel box is placed in a ceiling grid opening. Once placed in the grid opening the driver panel can be locked onto the T-bars.

Figure 5:
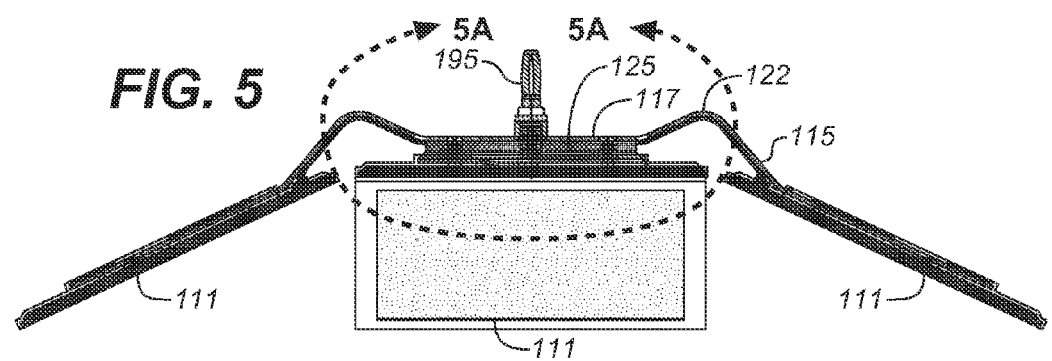
FIG. 5 is a side elevational view thereof.

The panel driver is locked onto the T-bars using locking clips 75 and thumb screw 77 in connection with the selected ones of the tabs 32 provided along the in-turned edges 31 of the panel box 25. Prior to attaching the panel box cover 25 to the panel box, selected ones of the inset tabs are bent from their inset position within the in-turned edges to an upright position as shown. Openings in the tabs facilitate bending using a tool, such as a flat head screw driver, which can be inserted into the openings. With the bent-up tabs, the panel driver can be slid down in between the T-bars of the T-bar opening until it bottoms against the cross-foot 65 of the T-bars. As shown in FIG. 5, the locking clips 75 with thumb screws 77 can then be snapped over the T-bars' top rails 65 and bent-up tabs and the thumb screws tightened. These locking clips will lock the panel box to the ceiling grid and prevent unintended dislodgement of the driver panel from the grid ceiling, such as during an earthquake.

The components contained within the driver panel include the light module connector means 21, which can comprise at least one, and preferably a pre-figured array of banana plug sockets 79 mounted to the bottom wall 27 of panel box 25.

Other components contained in the driver panel can include voltage supply means such as ballast transformers for delivering the required voltage to the electrical sockets. The versions of the driver panels shown in FIG. 2 contains two ballast transformers 93 interspersed between the banana plug socket mounting brackets, with each of the ballasts being mounted to the bottom wall of the driver panel box via mounting flanges 95. Two ballasts are provided in order to accommodate the number of banana plug socket pairs shown. (A ballast with four sets of wires can typically be used for four socket pairs.) The number of ballasts required in the driver panel will depend on the number of sockets provided in the panel.

As above-mentioned, OLEDs can advantageously be used as light sources for the light modules that are connectable to the driver panels of a configurable ceiling lighting system using loadable cassettes in accordance with the invention. OLEDs can used to create a light module that is very light in weight and which presents a very compact lumen package that is well adapted to meeting different and varied lighting needs within a space through different clustering of the modules on a ceiling. The loadable cassettes of the invention hereinafter described, overcome the difficulty of providing a module to which OLED panels can be usefully connected and replaced.

Referring now to FIGS. 2-15, the OLED light modules 15, 17 each comprise a plurality of OLED cassettes 111, 113 attachable to and held in a tight cluster by a spider bracket 115 having a substantially flat center hub section 117 and radial arms 119 extending from the center hub section. In the illustrated embodiments of light modules, the spider bracket has four radial arms with a ninety degree separation between arms for holding four outboard OLED cassettes 111 at ninety degrees to each other. A fifth center OLED cassette 113 is held to the center hub section of the spider bracket between the outboard OLED cassettes to form a cluster of OLED cassettes with planar OLED light sources that face and emit light into the space below the driver panel to which the light module is connected. The outboard OLED cassettes can be angled relative to the center cassette, either down as in light module 15 or up as in light module 17. It can be seen that this causes each of the OLED cassettes, and thus the OLED panels, contained therein to lie in a different plane. By providing a light module with clustered OLED panels in different planes, light distributions can be achieved that allow spaces below the light module to be efficiently illuminated.

A suitable angulation of the outboard OLED cassettes relative to the center cassettes is about 25 degrees, and a suitable size for the OLED cassettes is approximately 4 inches square. The resulting light module produces a lightweight lumen package that that can weigh less than one pound, that can fit within a 1×1 foot footprint, and that can be configured on a ceiling having driver panels in accordance with the invention to address a wide variety of space illumination requirements. All of the OLED cassettes can be structurally identical or substantially identical so that any OLED cassette can be used interchanged with another OLED cassette of the light module.

The spider bracket of the light modules 15, 17 can be a thin unitary bent part, which is preferably fabricated of a strong, lightweight sheet material that holds its shape after bending. A thin spider bracket having these characteristics and a thickness of about 50 mils (0.050 inches) can be can be fabricated of a plastic-aluminum composite sheet material such as Reynobond® manufactured by Alcoa Inc. The radial arms 119 of the spider bracket include end connector members for holding the outboard OLED cassettes, and extension sections, which are denoted by the numeral 121 in the case of light module 15 and the numeral 123 in the case of light module 17. In the illustrated embodiment, the end connector members are in the form of flat connector plates 120, which can slide into the OLED cassettes as hereinafter described for easy attachment of the outboard OLED cassettes to the spider bracket. The extension sections of the radial arms can be bent to place the bracket's radial arms in a different plane than the center hub section. (Knock-outs, not shown, can be punched into the extension sections to facilitate bending.) They can also be designed to hide wires running between the center of the light modules and the outboard OLED cassettes. For example, in the arm-down version 15 of the light module, the bent extension section 121 provides an upward projecting arch 122 into which wires can be tucked so that they cannot be easily seen through the small gaps between panels. The radial arms can be identical to each other for holding any one of the identical OLED cassettes. However, the use of a spider bracket having different sized or configured radial arms for holding different sized or configured OLED cassettes is considered within the scope of the invention.

Figure 6:
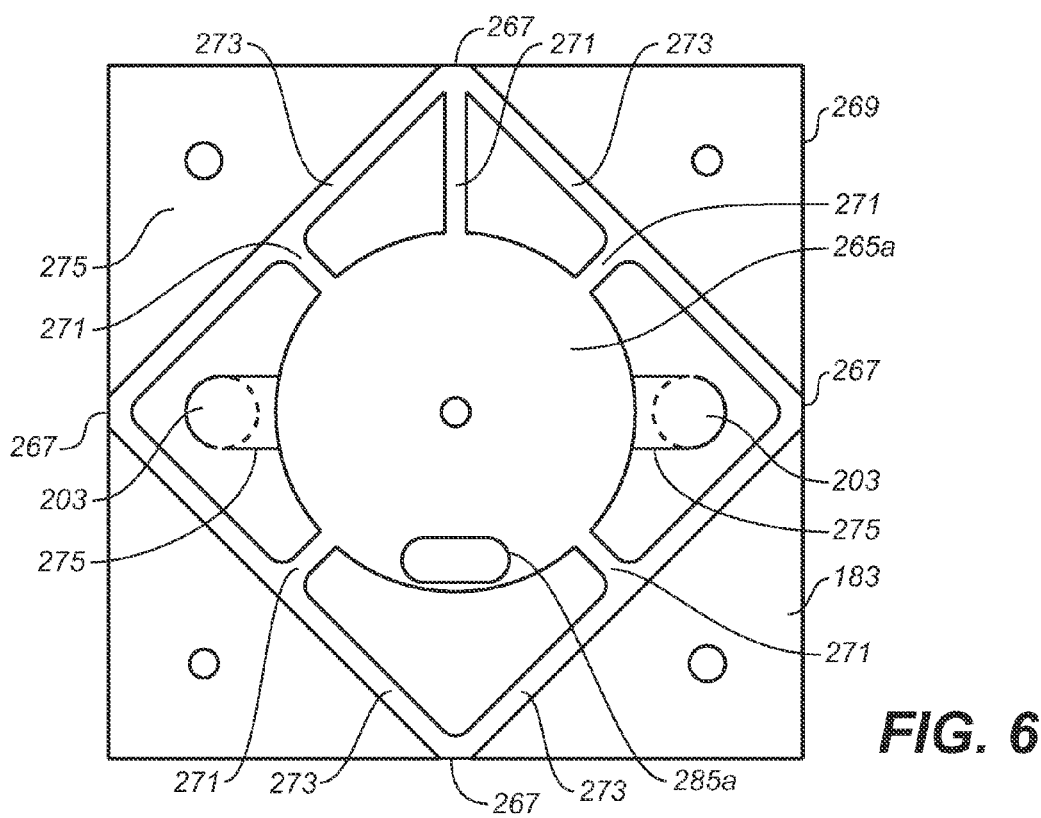
FIG. 6 is a bottom plan view of the top plate of the wire management block of the light module seen in FIGS. 5-5C.
Figure 7:
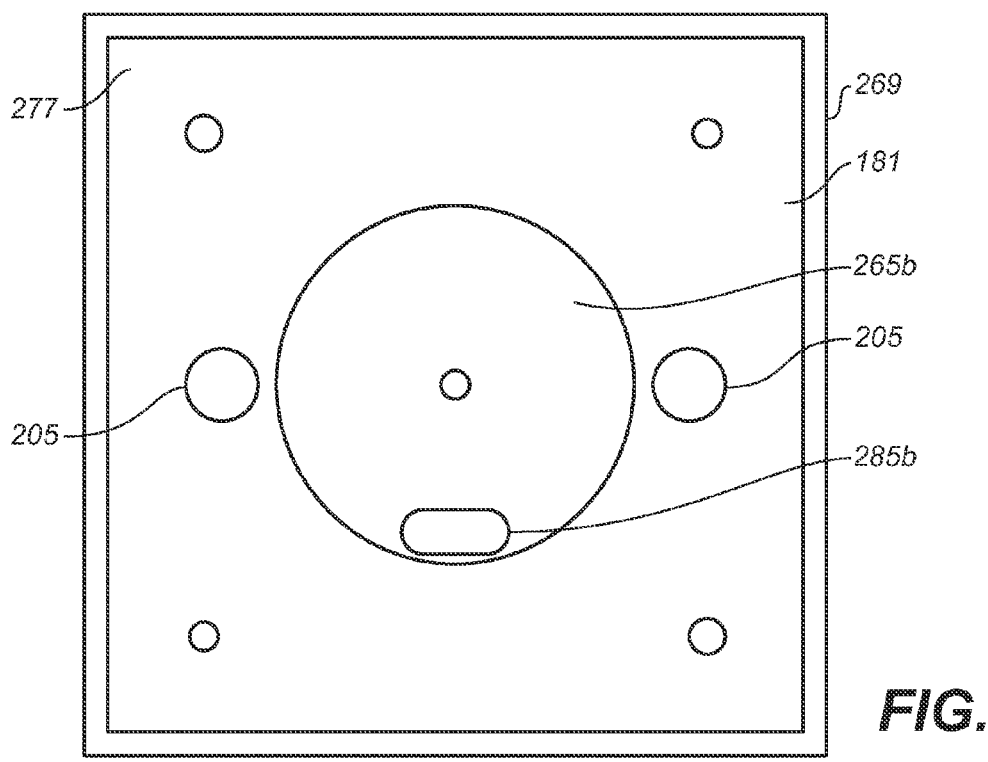
FIG. 7 is a bottom plan view of the base plate of the wire management block of the light module.

As best seen in FIGS. 5-7, the center OLED cassette 113 can be attached to the underside of the center hub section 117 of the spider bracket. A wire management block 125 sandwiched between the bracket's center hub section and the top of the center OLED cassette provides a means of attachment. It also provides a unique wire organizing function for wiring together the five OLED panels as hereinafter described. Before describing the wire management block and the attachment of the center OLED cassette to the spider bracket, the loadable OLED cassettes used with this describe light module will first be described in greater detail. (A "light module" may be considered a "luminaire" as that term is sometimes used herein.)

As above mentioned, the OLED cassettes 111, 113 of the illustrated light modules 15, 17 are substantially identical so that they can be interchanged one for the other at any position within the light module. As best seen in FIGS. 9-11, each of these universal cassettes is comprised of a thin, substantially planar base plate 127 having a bottom (or first) side 129 and a top (or second) side 131, and is loaded with a planar OLED panel 133 having a front light emitting side 135 and a back side 137. The back side of the OLED panel supports an electrical interconnection means for the OLED, preferably in the form of low profile side entry connectors 139, 140. (The electrical interconnections and unique placement of the electrical interconnection means are described in more detail below.) The bottom side of the base plate includes an OLED panel retention means that permits the OLED panel 133 to be retained by the base plate so that the light emitting surface 134 on the front side of the panel is exposed for emitting light from the bottom of the cassette. The top side 131 of the base plate has a further retention means, in this case spider bracket retention means that permit the OLED cassette to be retained on one of the radial arms of the spider bracket or alternatively to the underside of center section of the spider bracket.

In this illustrated embodiment, the OLED panel retention means on the bottom side of the base plate 127 includes a bottom perimeter rim 143 integrally formed on the bottom side of the base plate that extends beyond a front edge 145 of the plate. The base plate and extending perimeter rim form a slide channel 147 that has an open front loading end 149.

Figure 9A:
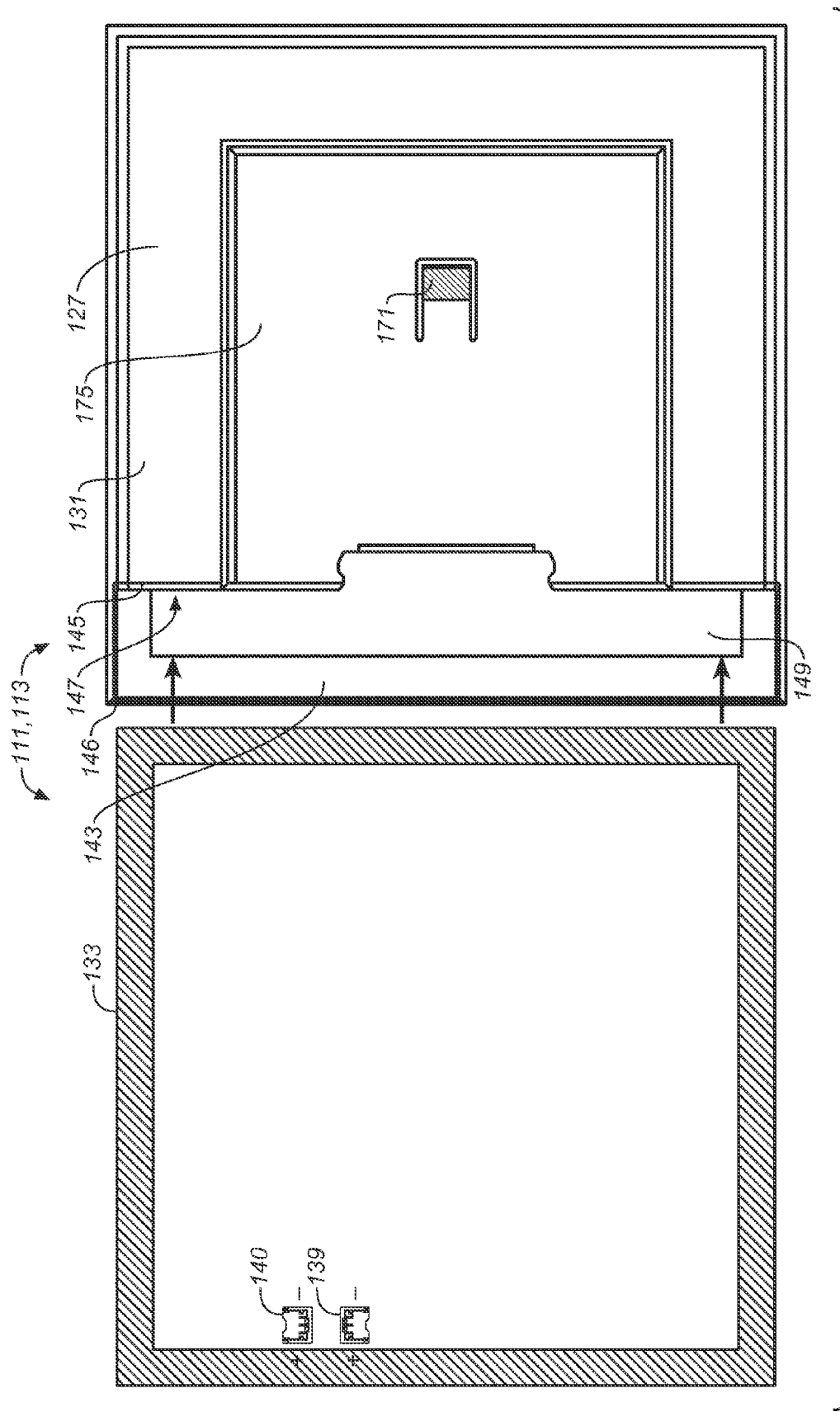
FIG. 9A is an exploded top plan view of an OLED panel and base plate of an OLED cassette in accordance with the invention for use with the light module illustrated in the foregoing figures, and showing an OLED panel being inserted into the front loading end of the base plate.
Figure 9B:
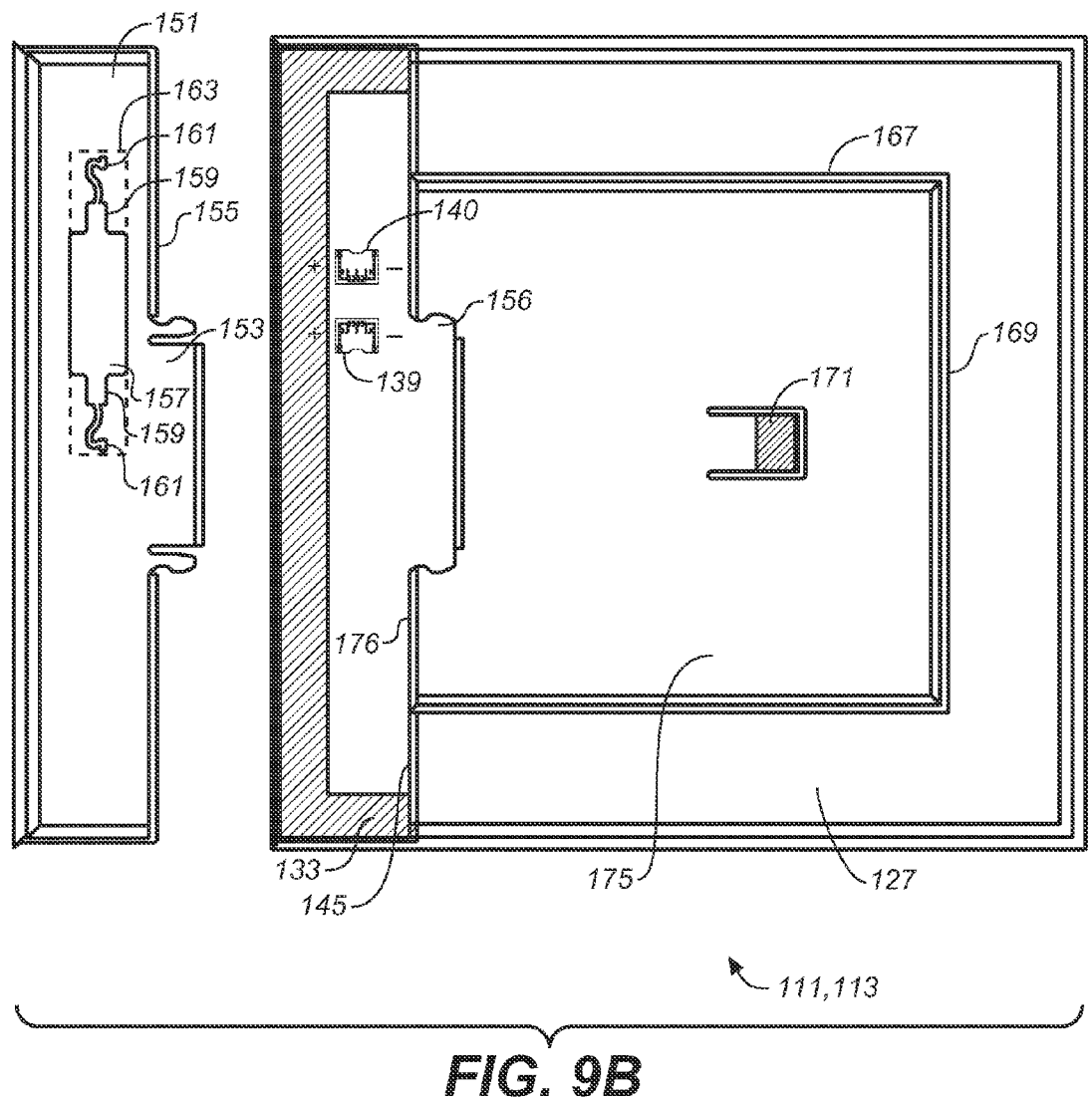
FIG. 9B in a top plan view of the OLED cassette with the OLED panel inserted into an OLED retention pocket on the bottom (first) side of the base plate of the cassette and an edge cover strip for the OLED retention pocket exploded away from the cassette.
Figure 9C:
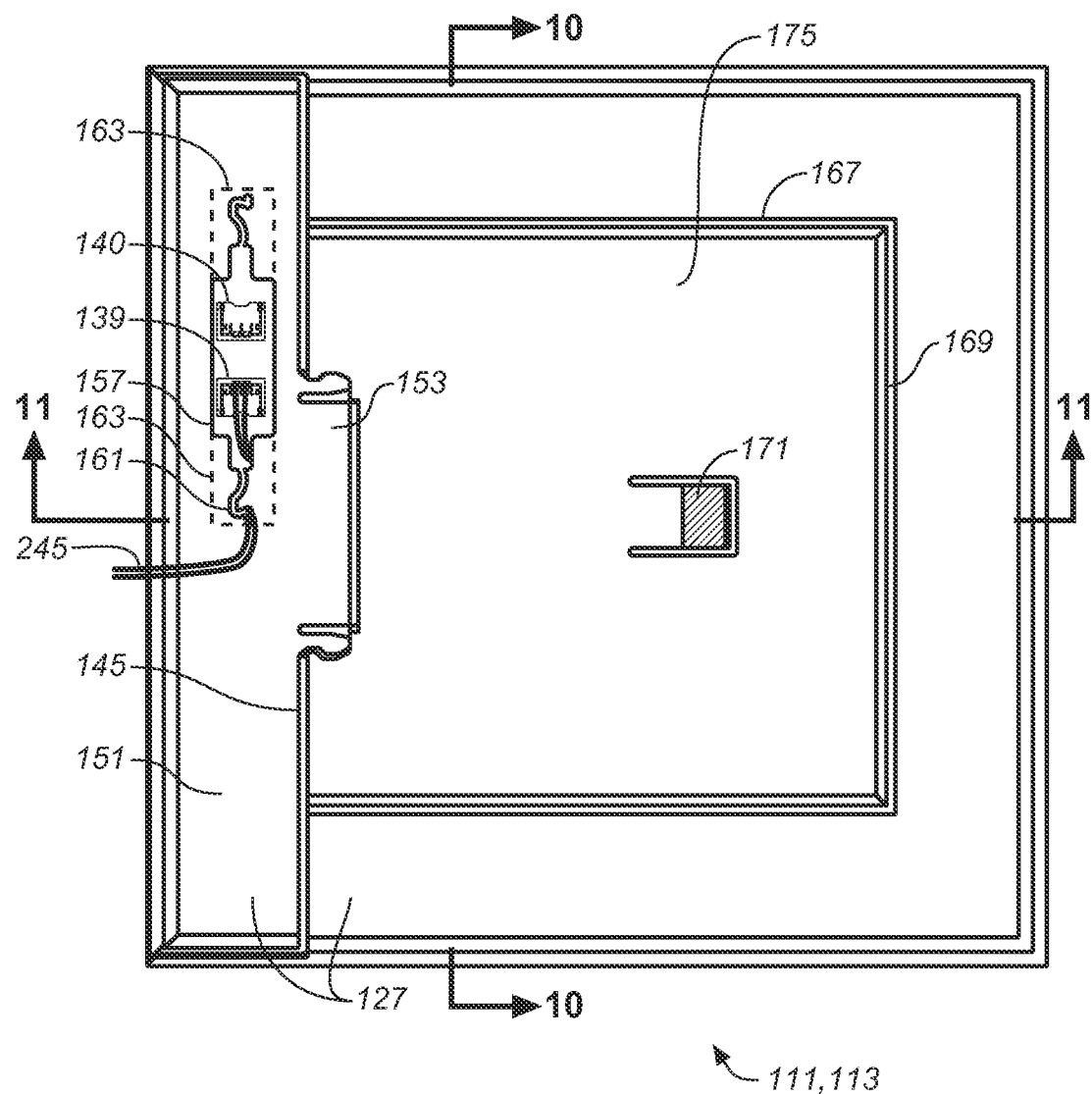
FIG. 9C is a top perspective view of the OLED cassette shown in FIGS. 9A and 9B fully assembled.

As illustrated in FIGS. 9A and 9B, the OLED panel 133 can be loaded into the cassette by inserting it into the bottom slide channel on the base plate through the open front loading end 149 of the slide channel. Once the OLED panel is inserted, the front loading end of the slide channel and the top exposed edge of the OLED panel—the edge that extends beyond the base plate's front edge 145—can be covered by cover strip 151, which, when snapped in place, provides an extension to and forms a part of the base plate of the cassette. The cover strip has a snap-lock projection 153 on its leading edge 155 that fits and locks within a corresponding snap-lock recess 156 in the front edge of the base plate. It further includes an electrical connection throughway in the form of a wire interconnector access opening 157 located such that the access opening lies over the interconnectors 139, 140 on the back of the OLED panel when the cover strip is inserted onto the frame. Access opening 157 is seen to include first narrow extensions slots 159 at its ends and further irregular and narrower slot extensions 161 at the ends of the first extensions. As later described, lead wire pairs having male side entry connectors for connecting to one of the interconnectors on the back of the OLED panel can be cinched into the narrower irregular extension slots to keep the lead wires in place and to help maintain the organization of the lead wires within the light module.

As indicated by dashed lines 163, recesses can be provided on the undersurface of the cover strip surrounding the extension slots to accommodate the short sections of wire that run beneath the cover strip and thin contactor pads on the back of the OLED. It is noted that all OLED wire connections and connectors are positioned entirely within the foot print of the OLED cassette thereby preventing any protrusions from the edge of the cassette that might interfere with adjacent cassettes or distract from the clean lines and aesthetic appearance of the cassette.

The bottom perimeter rim 143 formed on the base plate defines the overall size and shape of the OLED cassette, which, as above-mentioned, suitably can be about four inches square. This perimeter rim also provides a bottom opening 165 in the frame sized in correspondence with the light emitting surface 134 of OLED panel 133.

It is noted that opening and closure of the slide channel for the OLED panel could be accomplished by means other than the use of a completely detachable cover strip as above described. For example, a flat flexible hinge could be used to open and close the bottom of the cassette for insertion and removal of the OLED cassette.

The spider bracket retention means of the base plate can be provided on top of the cassette's base plate 127. As best seen in FIGS. 10 and 11, this retention means is comprised of a slide pocket 175 formed by parallel slide rails 167 and a back rail 169. A spring locking tab 171 projects up from the base plate and depresses when the flat connector plate 120 at the end of one of the radial arms of the spider bracket is slid over the tab. Each of the bracket's flat connector plates has a locking slot 173 positioned such that the spring tab 171 snaps into the locking slot, and thereby locks the bracket connector plate in place on top of the base plate when the connector plate is inserted all the way into the slide pocket 175. The connector plate can be released from the slide pocket by pressing down on the locking tab and sliding the connector plate out of the open front end 176 of the slide pocket.

Figure 5B:
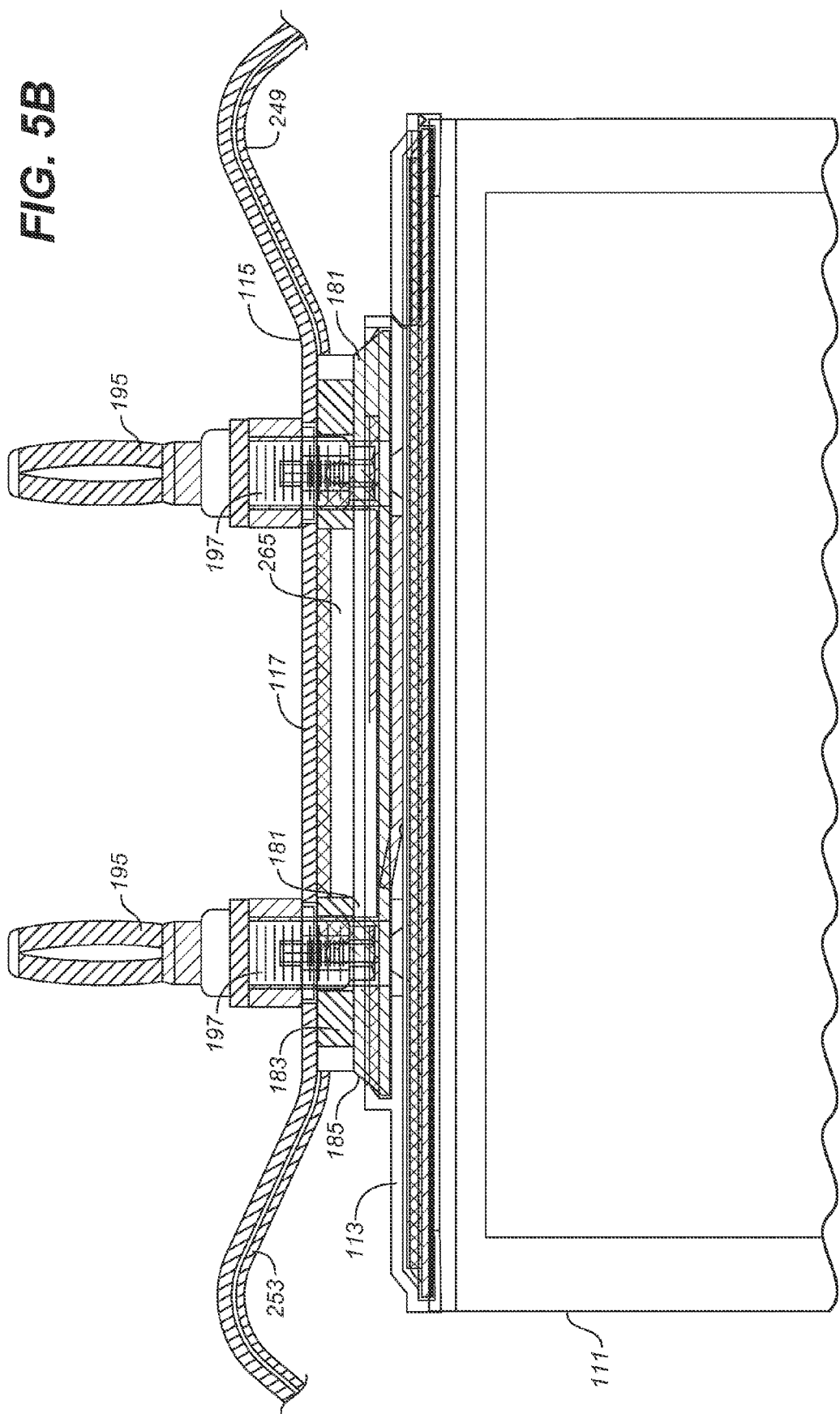
FIG. 5B is another enlarged fragmentary cross-sectional view thereof taken along section lines 5B-5B in FIG. 4.

Alternatively, the slide pocket 175 on the top or back of the OLED base plate can be used as retention means for an adaptor in the form of wire management block 125, which can be used to attach center OLED cassette 113 to the underside of the center hub section 117 of the spider bracket 115. As best seen in FIGS. 5A-5C, wire management block 125 is comprised of a base plate 181 and a top plate 183. The base plate is provided with extending side edges, here in the form of angled edges 185, which allow the base plate to be slid into and held by the side and back rails of the slide pocket 175 on the top of the base plate, that is, by the same slide pocket used to hold the radial arms of the spider bracket 115. The screw fasteners 187 can be inserted through lag holes 189, 191 in, respectively, the spider bracket and the top plate of the wire management block, and screwed into threaded holes 193 in the management block's base plate to secure the wire management block to the underside of the center section of the spider bracket. This will hold the center OLED cassette 113 retained by the base plate to the underside of the spider bracket.

Banana plugs 195 having threaded bases 197 can be mounted to the top of the center hub section of the spider bracket by screwing the threaded bases 197 of the banana plugs into the wire management block through banana plug mounting holes 201 provided in the bracket's center section. The threaded bases of the banana plugs can be screwed directly into the top plate 183 of the wire management block, which can be provided with suitably spaced apart threaded holes 203 for this purpose. (Corresponding holes or recesses 205 can be provided in the base plate 181 to accommodate any portion of the bases of the banana plugs that project below the bottom of the top plate.) As best seen in FIGS. 5A and 5B, the threaded base of each banana plug is surrounded with an insulating collar 207, which seats against the top of the center section of the spider bracket. This insulating collar, which is suitably made of PVC plastic, has a reduced diameter end projection 209 that fits within the mounting holes for the banana plugs to electrically insulate the bases of the banana plugs from the spider bracket.

Figure 8:
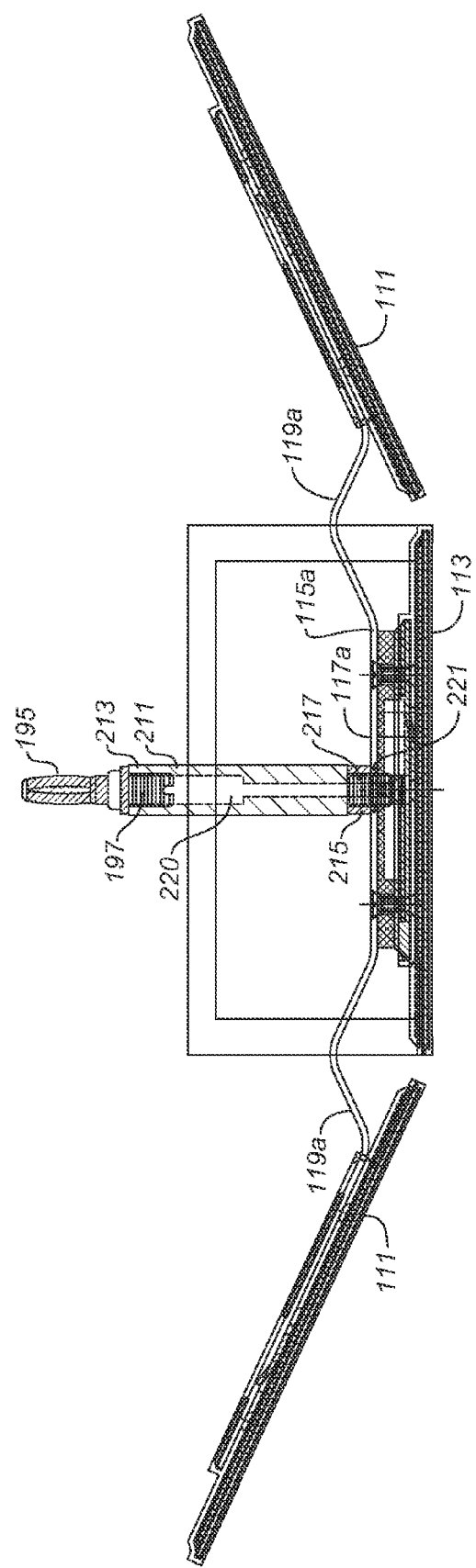
FIG. 8 is a cross-sectional view of the other version of the light module shown in FIGS. 1A and 1B, and which also uses loadable cassettes in accordance with the invention.

FIG. 8 shows in greater detail the alternative light module 17 having OLED cassettes 111, 113, constructed as above-described, connected to a spider bracket 115a having radial arms 119a that are bent up from its center hub section 117a instead of being bent down as in the case of light module 15. (Again, the angle of the arms relative to the center hub section of the spider bracket is suitably about 25 degrees.) Providing this arm-up version in addition to the arm-down version of the light module allows for interspersing of light modules on driver panels, such as the above-described driver panels 13, in a tight cluster without interference between the outboard OLED cassettes of the light modules. Due to its arm-up configuration, the banana plugs 195 for light module 17 are mounted to banana plug extensions 211 having a top end 213 into which the bases 197 of the banana plugs can be connected, and a bottom end 215 in which a secondary threaded base electrodes 217 can be provided. The body 219 of the extension includes an internal passageway 220 for a conductor (not shown) that connects the base of the banana plug to the secondary base electrode. It also provides a reduced diameter end projection 221, which, like the end projection 209 on the insulating collar 207 used on the arm-down version, fits within the mounting holes for the banana plugs.

The banana plugs 195 on top of the light module 15, 17 provide a means for electrically connecting the light modules 15, 17 to driver panels 13 placed within a grid ceiling. Banana plugs are preferably selected having an extraction force sufficient to hold the lightweight light modules in place once they are plugged in. Additional mechanical connections may be provided, such as a short tie wire (not shown) connected between the top of the spider bracket of the light module and the driver panel into which it is plugged.

Figure 12:
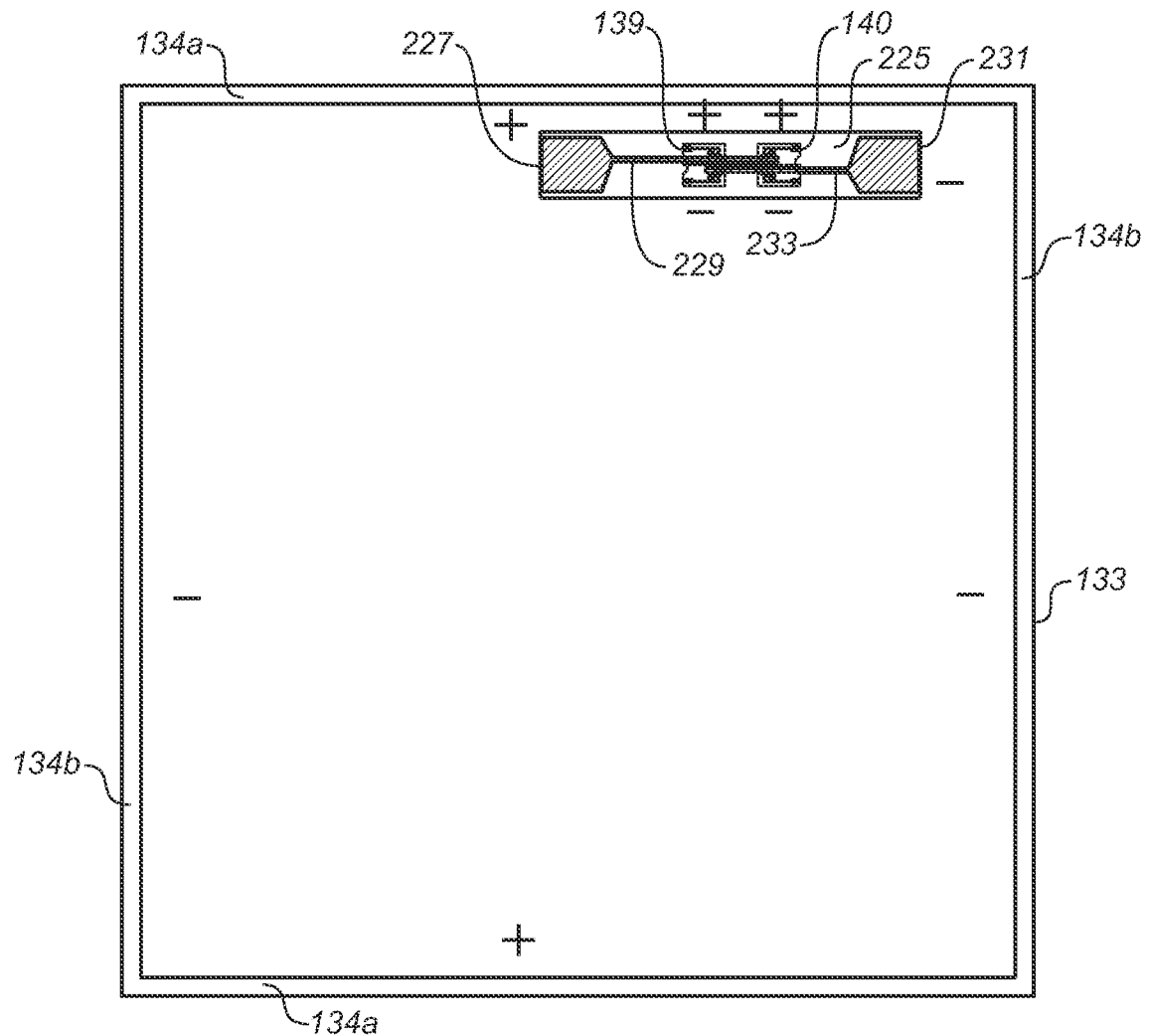
FIG. 12 is a top plan view of an OLED panel that can be loaded into the cassette, showing electrical interconnectors on the back of the OLED panel.
Figure 13:
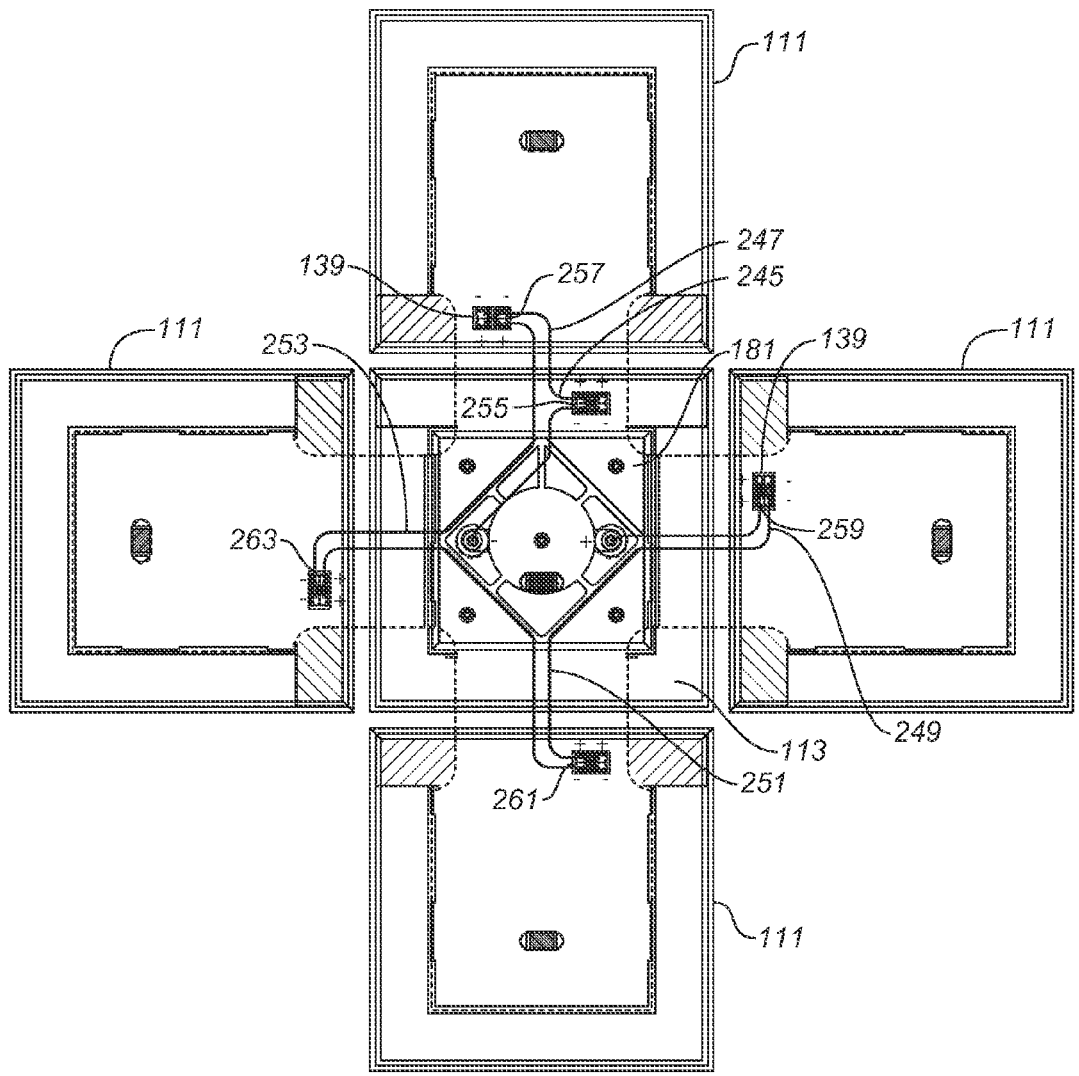
FIG. 13 is another top plan view of the light module illustrated in the foregoing figures showing wire organization and connections for OLED cassettes of the light module.
Figure 14:
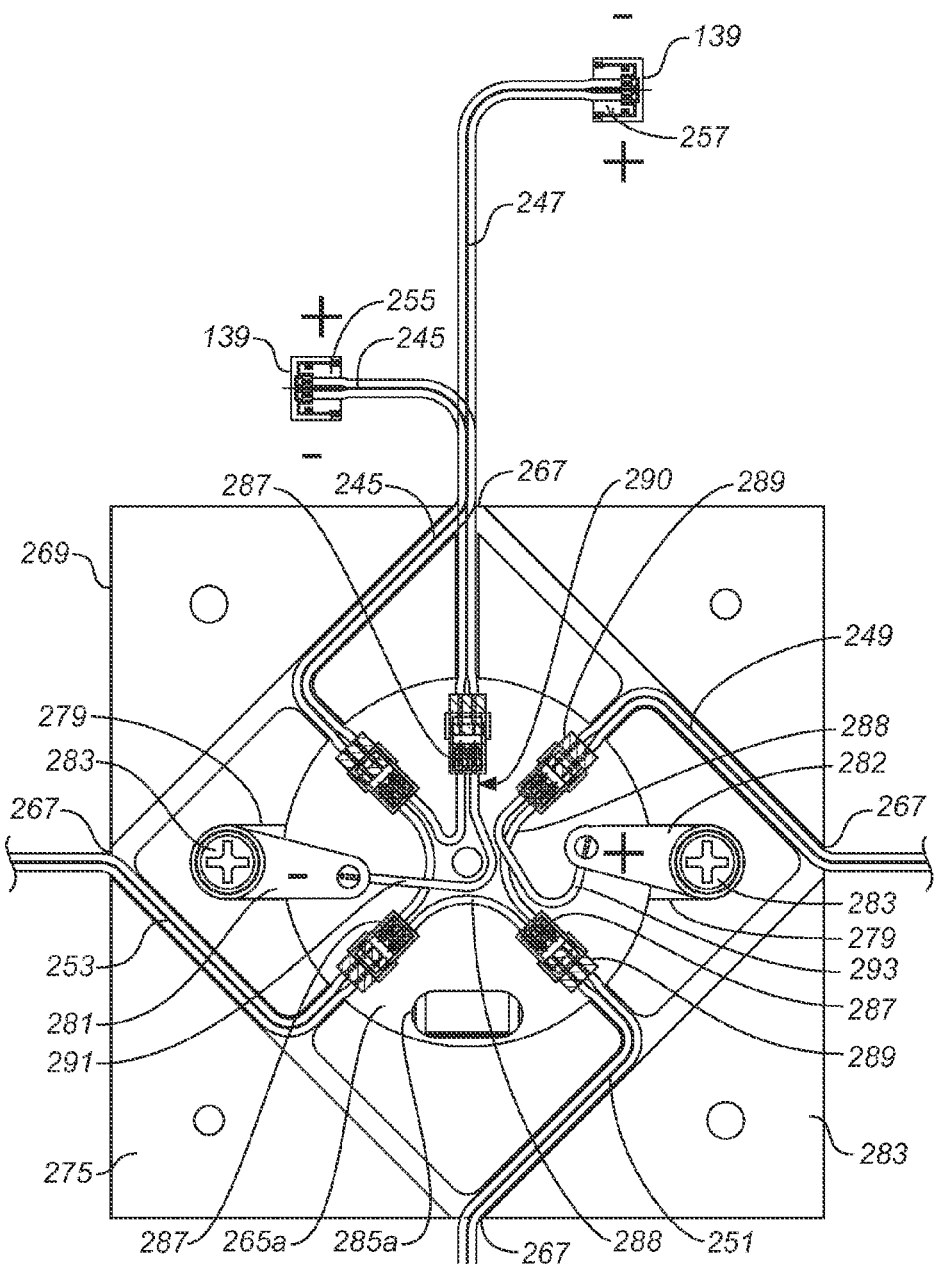
FIG. 14 is another bottom plan view of the top plate of the wire management block of the light module showing in more detail the wire organizing features thereof.
Figure 15:
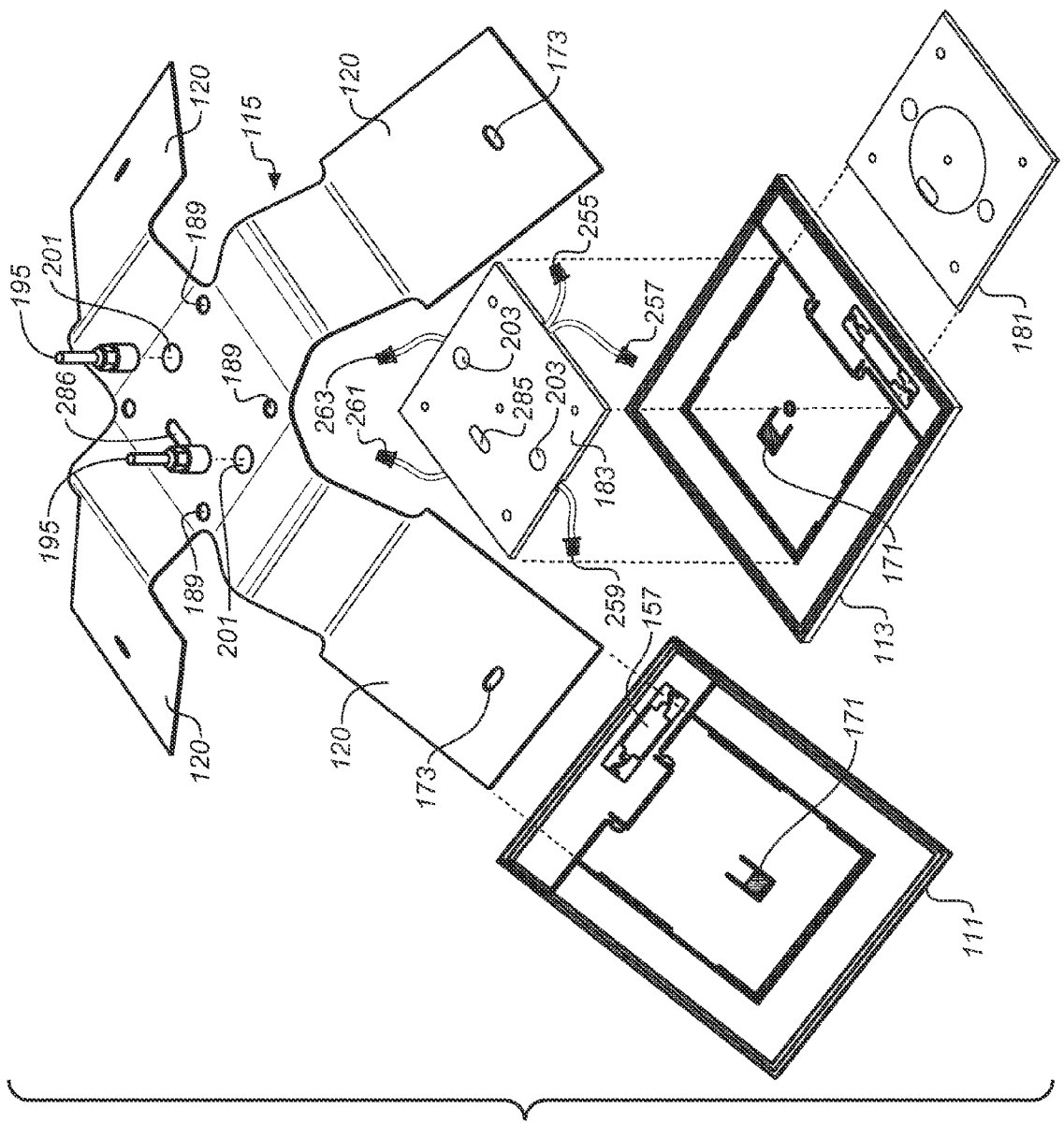
FIG. 15 is an exploded perspective view of the light module illustrated in the forgoing drawings, showing among other things the spider bracket, one of the four outboard OLED cassettes only, the center cassette, and the wire management block.

FIGS. 12-14 illustrate an electrical design and wiring scheme for the light modules used of the OLED cassettes above-described. FIG. 15 is an exploded view of the light module 15 which further illustrates the assembly of the light module and the wiring for the modules OLED cassettes 111, 113.

FIG. 12 shows the back of the OLED panel 133 and particularly the advantageous location of the electrical connectors inside the panel's perimeter. The OLED panel typically has opposed positive perimeter edges 134a and opposed negative perimeter edges 134b. The OLED panel will be energized, or "turned on," when the positive and negative sides of a threshold voltage are applied to these respective edges. The threshold voltage is supplied through the electrical connectors 139, 140, which are advantageously mounted inside of one of the perimeter edges of the OLED panel. The connectors, suitably side-entry ACH connectors, are mounted to a thin dielectric mounting strip 225 adhered to the back surface of the panel. A positive conductor plate 227 is fixed to one end of the mounting strip and is connected to the positive sides of the connectors by conductor path 229, and a negative conductor plate 231 is fixed to the other end of the mounting strip and is connected to the negative sides of the connectors by conductor path 233. One or more ribbon conductors (not shown) can be provided on the back of the panel to place the positive perimeter edges 134a of the panel in electrical contact with the positive conductor plate 227, and to place the negative perimeter edges 134b in electrical contact with the negative conductor plate 227. All of these conductor and insulator elements can be relatively flat and fit within the OLED base plate, and can be electrically isolated from one another where they cross.

The wiring of the light modules 15, 17, and the organization of the wire leads within the modules is now described in reference to FIG. 13-15. In the illustrated light modules the OLED panels of the OLED cassettes 111, 113 are connected in series. Because of this, only one of the OLED connectors, connector 139, is used. The OLED cassettes can also be connected in parallel, in which case both of the connectors 139, 140 would be used.

Wiring of the OLED panels of the illustrated OLED cassettes requires that pairs of lead wires 245, 247, 249, 251, 253 be available for connection to the chosen connector (e.g. connector 139) of each OLED panel 133 of each OLED cassette, namely, each of the outboard OLED cassettes 111 and center OLED cassette 113. Each pair of lead wires has a terminal end 255, 257, 259, 261, 263 having a connector that fits into the chosen connector on the OLED panel of an OLED cassette, and each wire of any one of the wire pairs is connected to a wire of a wire pair for another OLED cassette to create a series connection between OLED cassettes. This connecting up of wires along with the containment of the wires can be accomplished within a small space within the center wire management block 125 used to mount the center OLED cassette to the spider bracket.

The wire, or more broadly conductor organizing functions of the wire management block, can be achieved by providing in the block a central hub cavity 265 (see FIG. 5B) and wire organizing channels which are in communication with the central hub cavity and which carry wires from the hub cavity to wire exit points 267 at the edge walls 269 of the wire management block. Referring to FIGS. 6, 7 and 14, the wire organizing channels can include radial spoke channels 271 that are in communication with a rim channel 273, which is in communication with the wire exit points 267. The spoke channels carry wires from the hub cavity to the rim channel, and the rim channel feeds wires to the wire exit points of the block, all in an organized way that is further described below.

As earlier described, the wire management block can be fabricated in two halves, namely, with a base plate 181 and top plate 183. The central hub cavity is formed internally of the block by providing opposed, suitably cylindrical recesses 265a and 265b on the interior faces 275 and 277 of, respectively, the management block's top plate and bottom plate. These two opposed recesses combine to provide suitable depth to the center hub cavity for accommodating a bundle of wires and wire connectors. The wire organizing channels 271, 273 on the other hand can be shallower than the center hub cavity. Consequently, these channels need only be provided in one of the interior faces of the two plates of the of the wire management block. In the illustrated embodiment, the wire organizing channels are seen to be provided in the face 275 of the top plate 183.

The two plates of the wire management block are suitably fabricated of a polyvinyl chloride (PVC) plastic. PVC plastic offers light weight, desired electrical insulation properties, and strength. The recesses for the center hub cavity and wire organizing channels can be routed into the faces of the PVC blocks or created by other well known manufacturing techniques. Additional recesses 279 can be provided in the interior face 275 of the top plate 183, which extend from the banana plug base holes 203 to the center hub cavity. As seen in FIG. 14, these recesses accommodate the negative and positive conductor plates 281, 282 attached to the bottom of the base of the banana plugs. These attachments are made after the banana plugs are installed (as described above) by means of screw fasteners 283. Matching slots 285a, 285b in the top and base plates provide an access slot through the wire management block that aligns with a similar slot 286 in the center section of the spider bracket. These slots line up with the spring tab 171 in a base plate 127 for an OLED cassette, and permit a tool, such as a screwdriver, to be inserted to push the tab down to release the wire management block from the base plate.

FIG. 14 best shows the wire connections and organization within the wire management block 125. The wire management block routes the lead wire pairs 245, 247, 249, 251, 253 economically within the block from the central hub cavity 165 through the radial and rim channels and out the exit points 267 at block edge walls 269. A connector web 290 is provided in the center hub cavity for connecting up the lead wire pairs and for establishing a connection to electrical power supplied through the banana plugs. The connector web includes small connectors, such as ACH end entry or side entry connectors 287, one for each of the OLED cassettes. Short connecting wires 288 wire the connectors 287 together in series and to the negative and positive bottom conductor plates 281, 282 for the banana plugs. Each of the lead wire pairs 245, 247, 249, 251, 253 has an interior connector 289 to allow the lead wire pairs to be connected to the connector web within the hub cavity before assembly of the plates of the wire management block.

It is contemplated that the wire management block can be provided in the form of the printed circuit board wherein the "wires" within the block are conductor paths of the printed circuit board. Using a printed circuit board, the interior connectors 289 can be eliminated. Connectors, such as side entry connectors, could be provided at the midpoints of the perimeter edges of the management block (where the wire exit 267 are located), to allow lead wires to be connected to the edges of the block. The conductor paths of the printed circuit board would provide the same conductive paths as the wires shown in FIG. 14. Internal connector pads could be provided which would be contacted by or otherwise electrically connected to the bases 197 of the banana plugs.

Assembly of either of the illustrated arm-down or arm-up light modules 15, 17 is essentially the same. With reference to FIGS. 5C and 13-15, wire management block 125 and center OLED cassette 113, loaded with an OLED panel, can be attached to the spider bracket 115. This can be done by first sliding the base plate 181 into the slide pocket 175 of the base plate of one of the OLED cassettes—which becomes the center OLED cassette 113—until the base plate snaps into place on the spring locking tab 171 on the top or back of the base plate of the OLED cassette. The top plate 183 of the wire management block can separately be mounted to the underside of the center hub section of the spider bracket by screwing the threaded bases of the banana plugs 195 into the threaded holes 203 in the top plate. The connector web can then be installed in the recess 265a in the bottom of the top plate by fixing the negative and positive lead wires 291, 293 for the connector web to, respectively, the banana plug negative and positive conductor plates 281, 282. This can be accomplished by screwing the conductor plates 281, 282 down onto the connector web lead wires by screw fasteners 283. The cassette lead wire pairs 245, 247, 249, 251, 253 can then be connected to the connector web and pressed into the wire organizing channels 267, 269 so that, except for the cassette lead wire pair for the center OLED cassette, a different cassette lead wire pair emerges from a different wire exit points 267 at a different edge wall 269 of the wire management block. The lead wire pair 245 for the center OLED cassette can emerge from the same wire exit point as one of the other cassette lead wire pairs, preferably on the edge closest to the wire interconnector access opening 157 in the edge cover plate 151 of the base plate of the center OLED cassette.

The center OLED cassette can then be attached to the underside of the spider bracket by placing the captured bottom plate of the wire management block against and attaching it to the top plate attached to the spider bracket, thereby capturing the connector web and interior ends to the cassette lead wires in wire management block. The outboard OLED connectors, each loaded with an OLED panel, can then be inserted onto the connector plates 120 of the radial arms of the spider bracket until they snap into place on the base plate's spring tabs. The ends to the cassette lead wire pairs extending from the wire management block can then be connected to the wire interconnectors 139 mounted to the back of the OLED panels through the wire interconnector access openings 157 in base plates. Preferably the cassette lead wire pairs will have a length that allows the wires to be pushed up out of view against the upward projecting arch 122 of the bent extension 121 of the brackets' radial arms, with little if any excess wire existing between the wire management block and OLED cassettes. Cinching of the wire in the narrow irregular slot extensions 161 of the base plate's wire interconnector access openings will keep the lead wires centered and prevent them from poking out of the access opening in an unsightly manner.

It will be appreciated that the order of assembly described above could be altered.

Removal of an OLED cassette to, for example, replace a damage or spent OLED panel can readily be accomplished by disconnecting the cassette lead wires for the panel and then removing the panel from the spider bracket by the release mechanism provided, in this case by the pressing the base plate's spring tab 171 through the provided access slots. In the case of the center OLED cassette, the outer cassette adjacent the front 176 of the center cassette's slide pocket 175 can first be removed to allow the center cassette to be slid off to the base plate of the wire management block.

FIGS. 16-27 illustrate an alternative embodiment of the OLED cassette previously described. In this embodiment, the need for electrical connectors on the OLED, such as the side entry connectors shown in FIG. 9A are eliminated and the loading of the OLED in the cassette and the mounting of the cassette on a support structure so that the OLED panel is electrified is greatly simplified. OLED panels can be bottom loaded into the cassette with the electrical connections to the circuit that powers the OLED being made automatically made when the OLED is loaded.

In this alternative embodiment, the cassette, denoted 325, includes a substantially planar base plate 327 having a top side 329, a bottom side 331, and a perimeter edge 333. (The bottom side 331 may sometimes be referred to herein as the first side and the top side 329 as the second side.) The perimeter edges 333 can be provided with a series of recessed snap ledges 335 for an OLED panel capture ring. More, specifically, means for retaining an OLED panel to the bottom side of base plate 327 in this illustrated embodiment is provided in the form of a separate panel capture ring 339 that snap-fits onto the perimeter edges 345 of the base plate of the cassette. The panel capture ring has vertical ring walls 341, an inwardly turned lip 343 at the bottom of the ring walls, and a top snap-fit edge 345 at the top of the ring walls. Top snap-fit edge 345 can have an inner chambered surface 347 and snap-fit projections 349 that snap onto and engage the recessed snap ledges 335 on the perimeter of the base plate when the capture ring is snapped onto the bottom side of the base plate.

Figure 27:
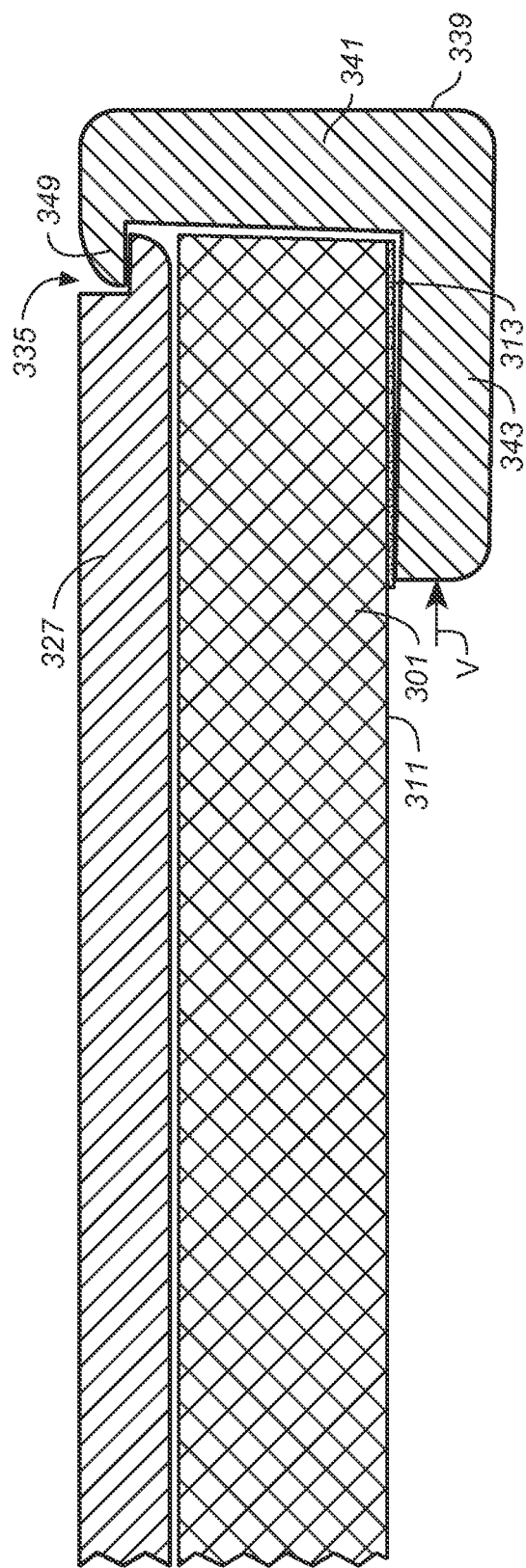
FIG. 27 is an enlarged fragmentary view of an assembled cassette with an OLED panel loaded therein for the version of the cassette shown in FIGS. 16-26.
Figure 28:
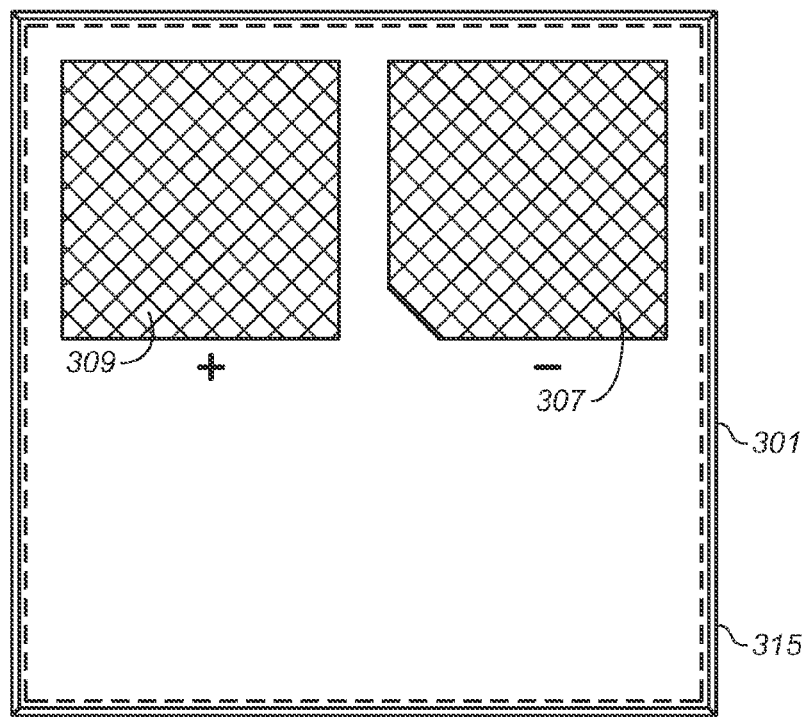
FIG. 28 is a top plan view of an OLED panel with surface electrodes, that is, of a type of OLED panel that would be used with the version of the cassette shown in FIGS. 16-27.
Figure 29:
FIG. 29 is a cross-sectional view thereof in side elevation.
Figure 30:
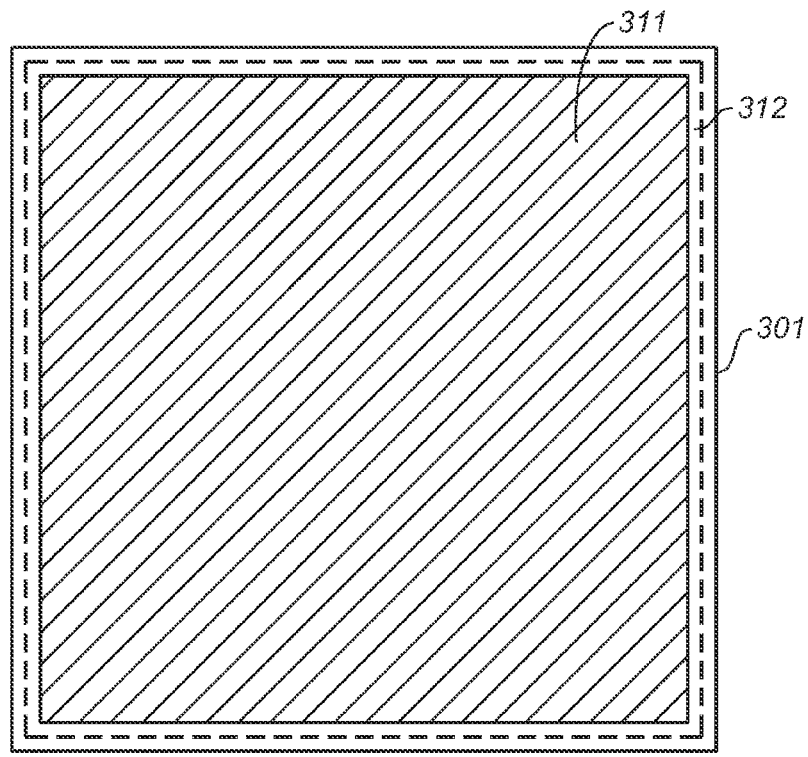
FIG. 30 is a top plan view thereof.

The embodiment disclosed in FIGS. 16-27 can be used to hold an OLED panel such as illustrated in FIG. 28-30, wherein OLED panel 301 has a light emitting front side 303 and back side 305, and wherein the back side of the OLED panel is provided with positive and negative surface contact electrodes 307, 309, which are suitably large area planar electrodes for providing relatively large electrical contact surfaces. The light emitting side of the panel has a luminous area 311 surrounded by a narrow non-luminous perimeter area 313; light is only emitted from the luminous area when the OLED panel is switched to an "on" state. The panel's perimeter edges 315 define the size of the OLED, which in turn dictates the size of the OLED panel retention means of the cassette.

Figure 16:
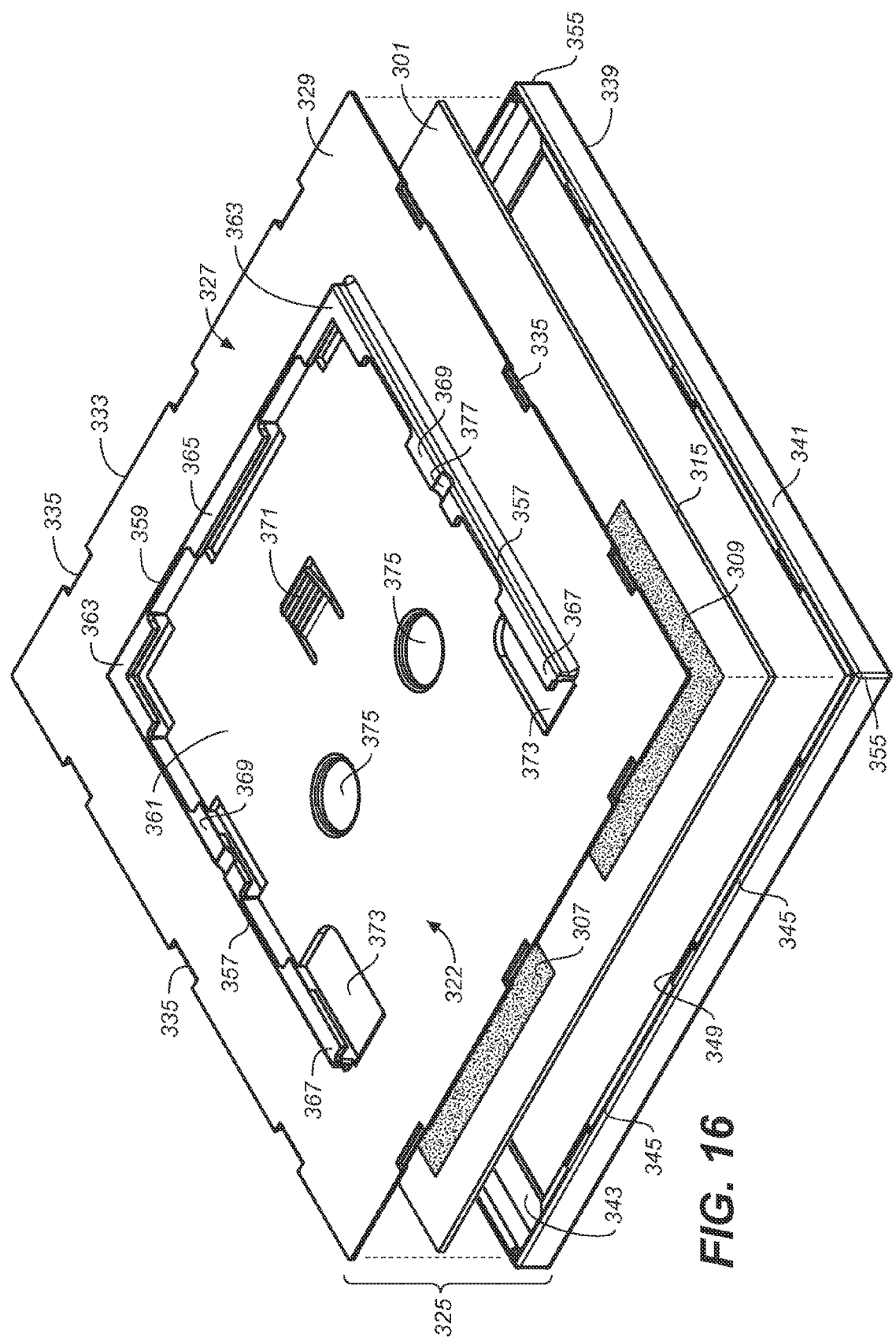
FIG. 16 is an exploded top perspective view of an alternative embodiment of a loadable cassette for a planar light source in accordance with the invention.
Figure 17:
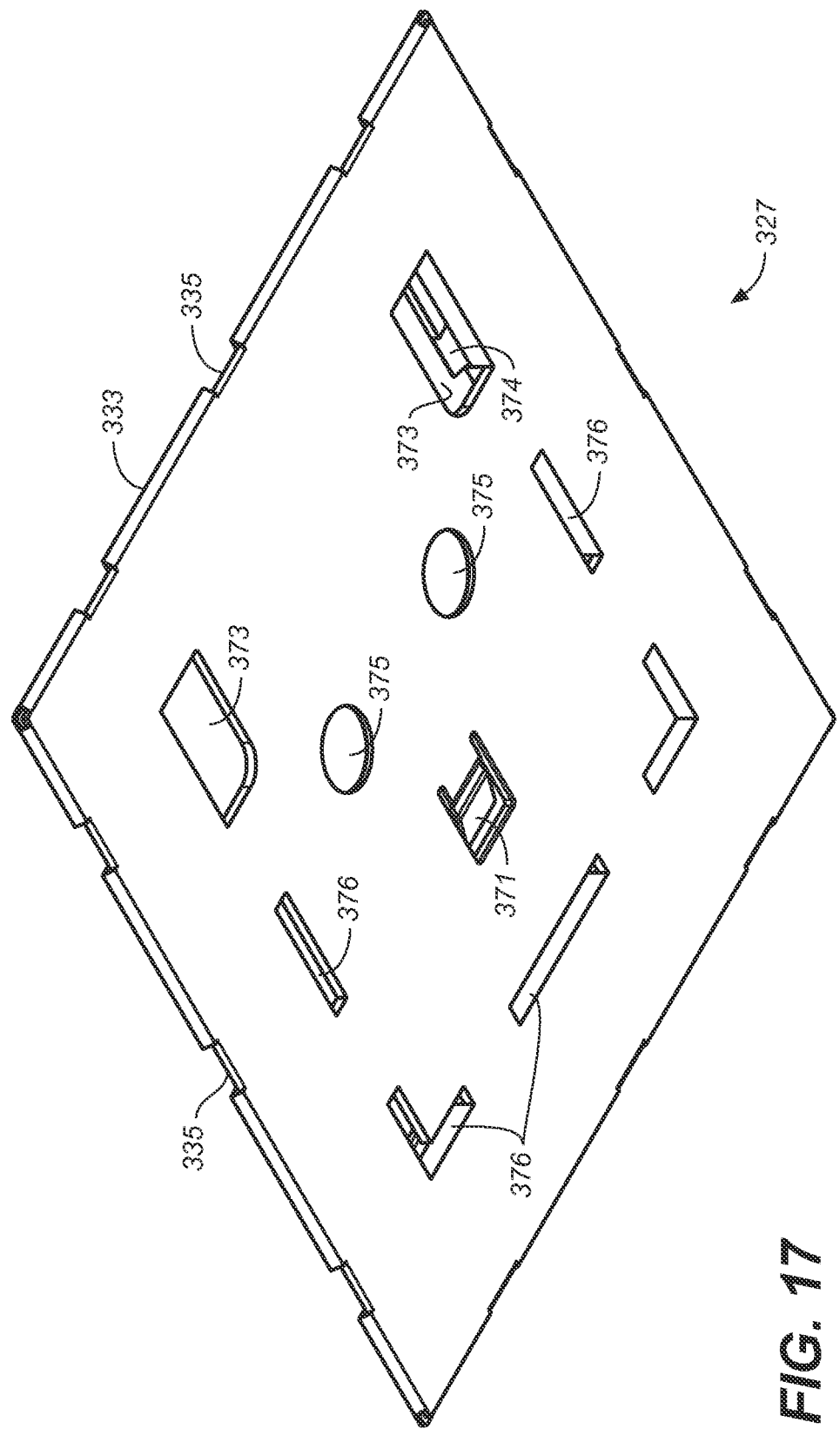
FIG. 17 is a bottom perspective view of the base plate of the cassette shown in FIG. 16.
Figure 22:
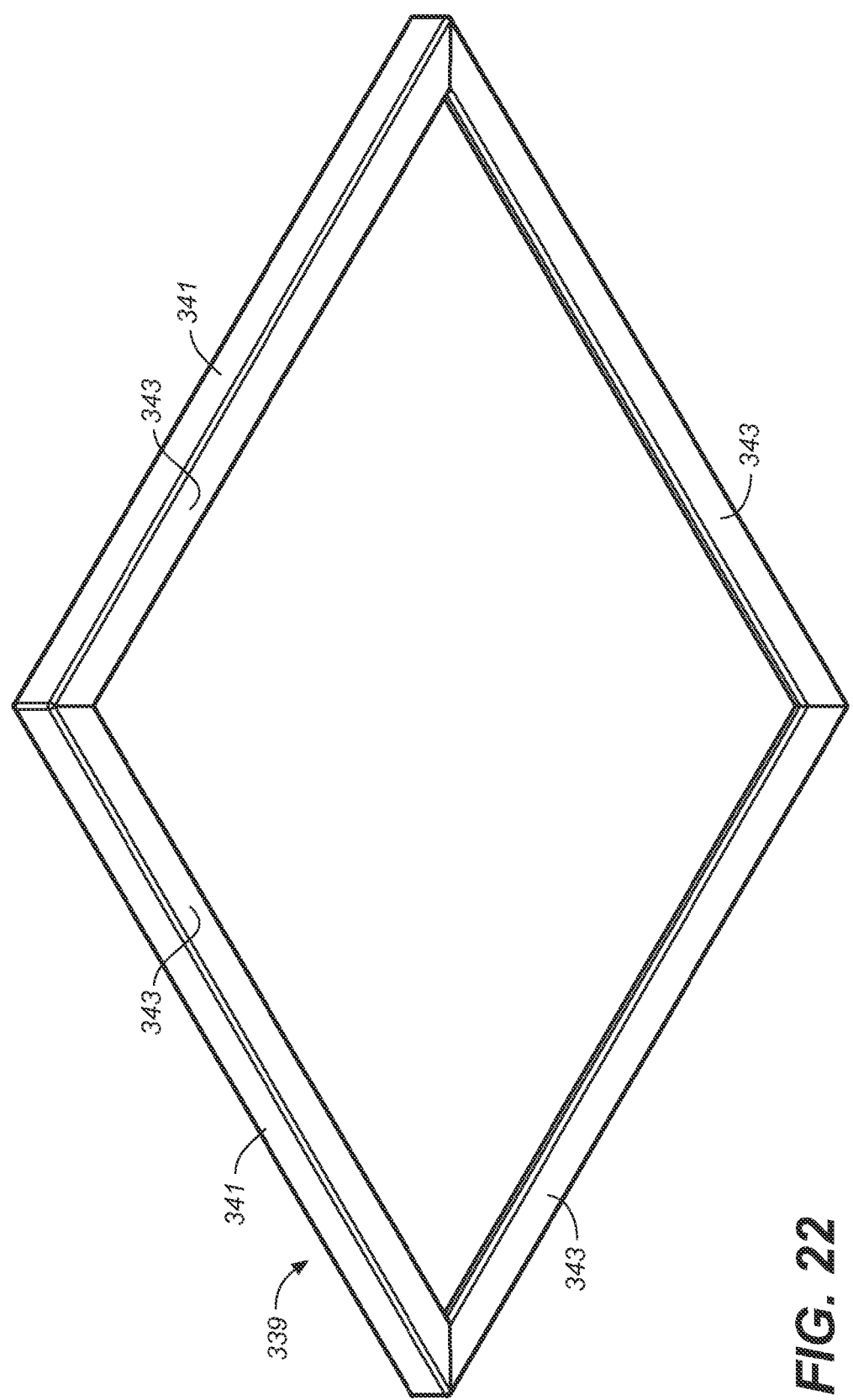
FIG. 22 is a bottom perspective view of the OLED panel capture ring of the cassette shown in FIG. 16.
Figure 23:
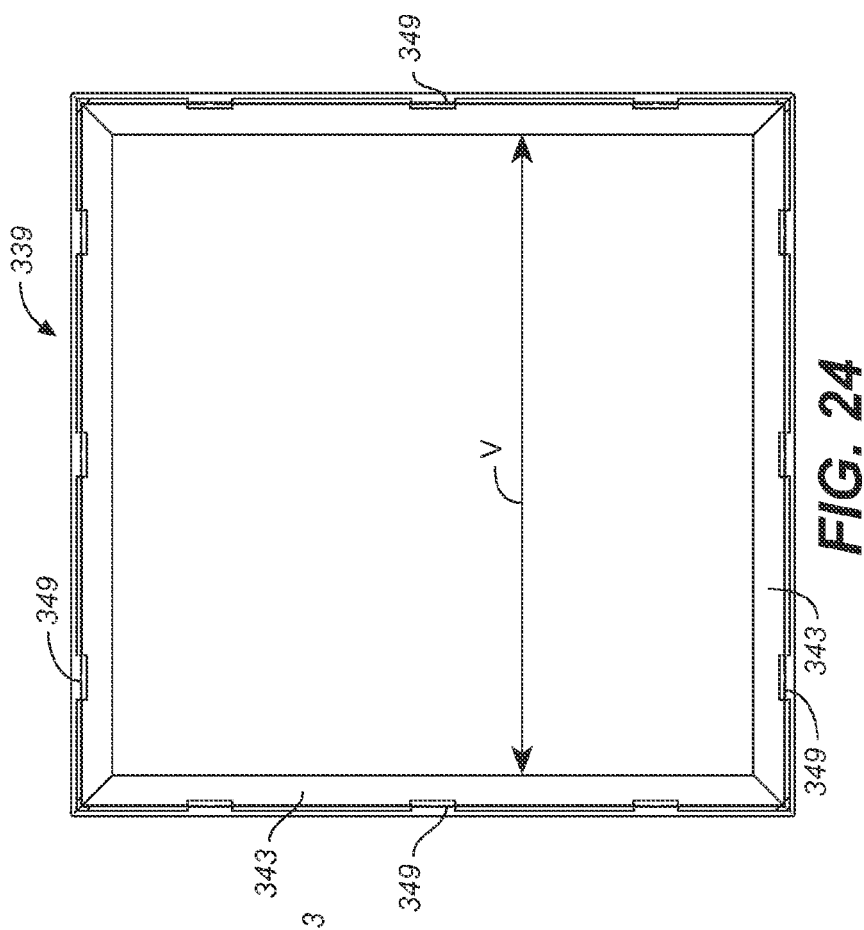
FIG. 23 is a bottom plan view thereof.
Figure 24:
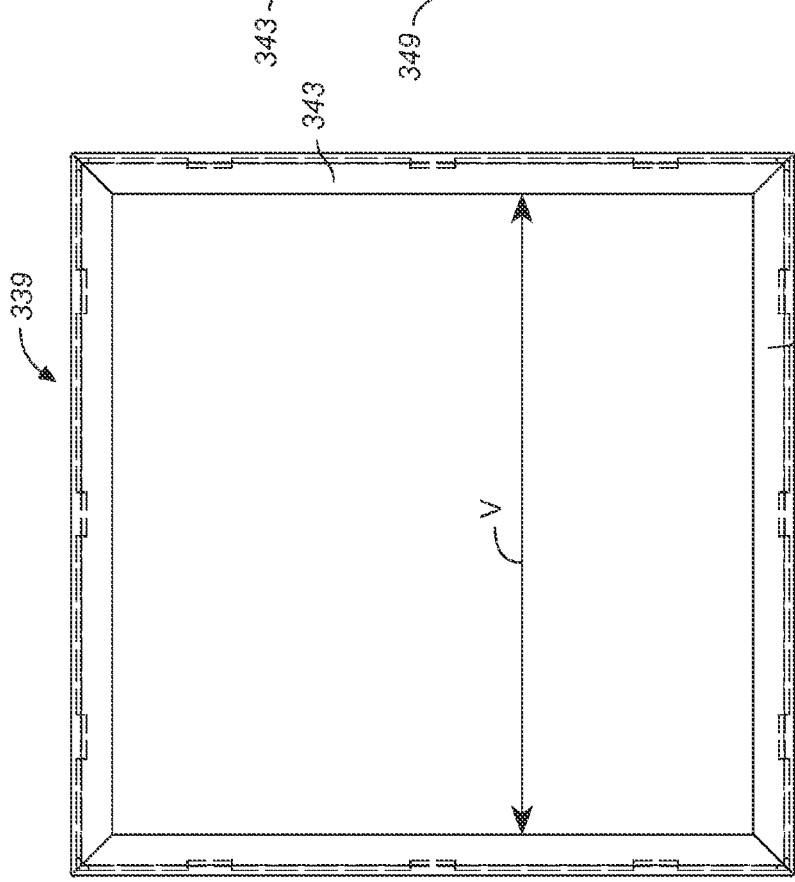
FIG. 24 is a top plan view thereof.
Figure 25:
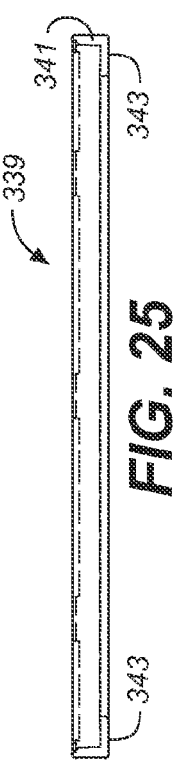
FIG. 25 is a side elevational view thereof.
Figure 26:
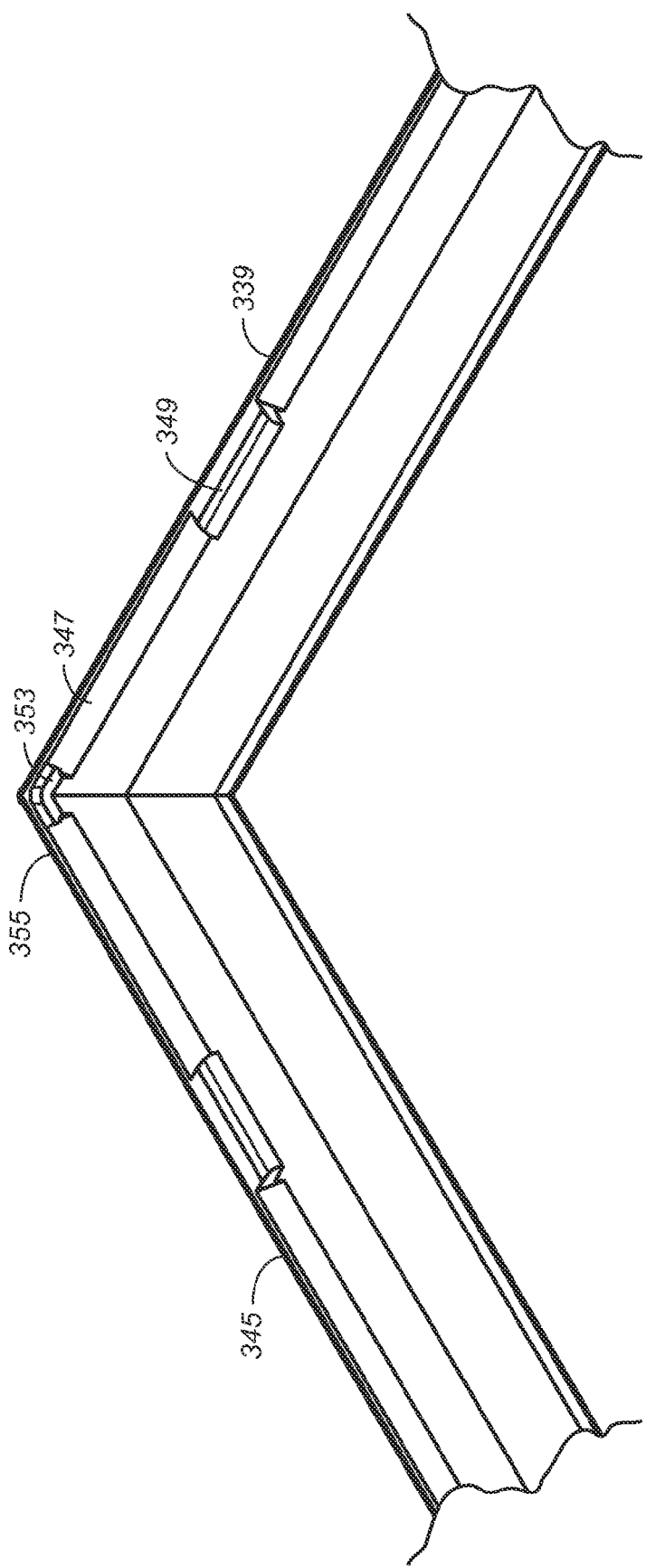
FIG. 26 is an enlarged fragmentary top perspective view thereof.

Affixing OLED panel 301 to the bottom side of the base plate is generally illustrated in FIG. 16. First, it is seen that the base plate is preferably sized in correspondence with the OLED panel to be held in the cassette. (Suitably the OLED panel can be about four inches square.) Thus, when the OLED panel 301 is placed against the bottom side 331 of base plate 327, their perimeter edges substantially align. To affix the OLED panel to the base plate, the capture ring, which is also sized in correspondence with the base plate, is simply snapped onto the base plate over the OLED panel. The ring walls of the capture plate will closely surround the OLED panel's perimeter edges 351, and the ring's inwardly turned lip 343 will extend over the perimeter OLED panel's edges 315. As best shown in FIG. 27, lip 343 can be angled slightly upwardly toward the OLED panel to ensure a positive contact with the OLED panel at the end of the lip around the entirety of the perimeter of the OLED. This will prevent shadowing in the viewable area of the lighting emitting surface of the OLED panel around the edges of the capture ring. Also, the turned-in lip 343 can be sized so as to create a viewable area, denoted by the letter "V" in FIGS. 23 and 24, which is slightly larger than the luminous area 311 of the OLED's light emitting surface. It is found that a slight oversizing of the viewable area V relative to the OLED's luminous area (by approximately 0.05 inches) increases light output from the cassette thereby boosting efficiency of a luminaire.

The illustrated capture ring is seen to have inset seating surfaces 353 at each corner 355 of the capture ring below its snap-fit edge 345. These corner seating surfaces provide a positive stop when the capture ring is engaged against the base plate. These stops provide for a snug fit between the base plate and the capture ring and prevent the capture ring from exerting excessive pressure on the OLED panel.

The base plate and capture ring of cassette 325 can suitably be fabricated of an insulator material such as PVC plastic.

The mounting of the cassette to a low profile mounting structure—such as radial arms 119 of spider bracket 115 of the light module previously described, or the mounting adaptor hereinafter described—is accomplished on the top side 329 of the base plate. The base plate's top or second side is seen to include parallel side rails 357 and a back rail 359, which form a pocket 361 having an open end 362. A planar mounting structure or plate can be secured in the pocket by a sliding motion from the direction of its open end, and is retained by turned-in spaced apart capture walls at the top of the rails, which include back corner capture walls 363, back capture wall 365, and side capture walls 367, 369. (Relief slots 376 can be provided in the base plate below the capture walls to prevent any wedging of the planar mounting structure between the capture walls and base plate.) Spring tab 371 is provided in the back wall to lock into a corresponding spring tab opening in the mounting structure; when the planar mounting structure is slid into pocket 361 the spring tab will be depressed and then releasably snap into the spring tab opening when the mounting structure is fully engaged in the pocket.

The rails 357, 359 can suitably be designed to allow a cosmetic cap (not shown) to be attached to the back of the cassette. For example, a portion of the underside of the turned-in side capture walls can have angled undercuts 373, 375 into which a tab of a cosmetic cap can snap. Detents 377 can be provided on the side capture walls to accommodate a mounting rod running across the back to the cassette.

When the version of the cassette illustrated in FIGS. 16-27 is used with the light modules 15, 17 of the configurable ceiling lighting system above described, the cassettes can be connected to the flat arms 120 and flat center hub section 117 of spider bracket 115 in substantially the same manner as the earlier described cassettes 111, 113. However, the spider bracket arms would be designed to include spring electrodes (not illustrated) that would come into contact with the surface electrodes of OLED panels such as illustrated in FIGS. 28-30 when the cassettes are fully engaged on the bracket arms and center hub. OLED panels can be readily removed from and replaced by new OLEDs by simply removing the capture ring 339, dropping the OLED panel 301 from the bottom side of the cassette's base plate 329, placing a new OLED against the base plate, and snapping the capture ring back onto the base plate. This can be done while the base plate remains attached to the spider bracket arms and hub.

Loadable cassettes in accordance with the invention such as described herein can be used in creating a wide variety luminaire or lighting system configurations other than the above-described configurable ceiling lighting system. The cassette is suitable for use where generally planar low profile light sources such as OLEDs are desired and are also suitable where the light sources are to be mounted to low profile mounting structures containing electrical conductors of a luminaire or lighting system. Adaptors can be used to mechanically and electrically interconnect the loaded cassette to the mounting structure, such as a rail configuration that contains the necessary conductors for electrifying the panel light sources.

Figure 31:
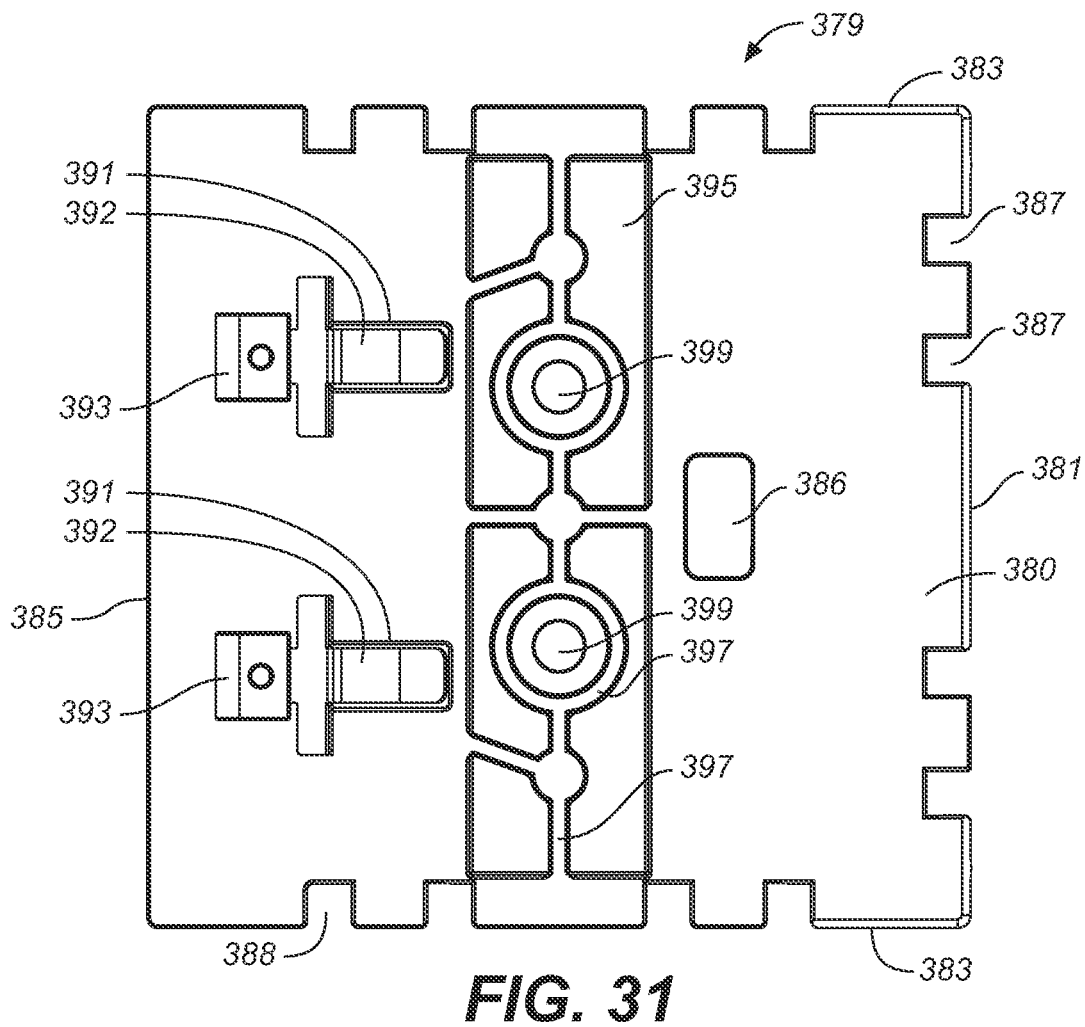
Figure 34:
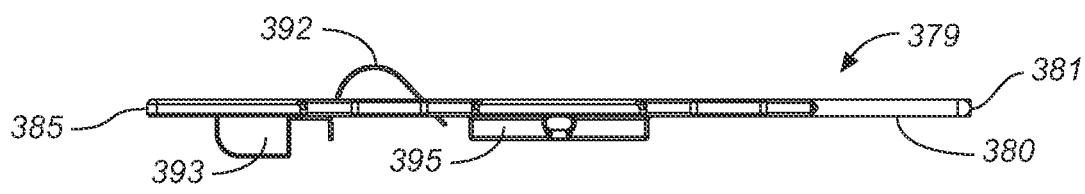
FIG. 34 is a bottom perspective view thereof.
Figure 32:
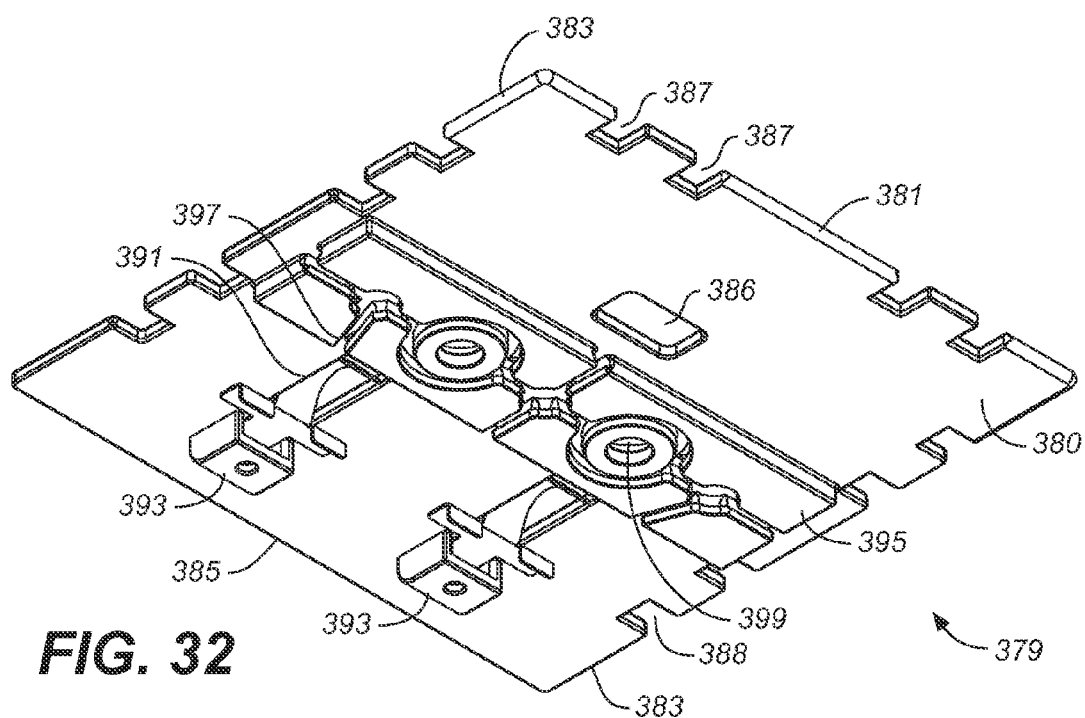
FIG. 32 is a top perspective view thereof.
Figure 33:
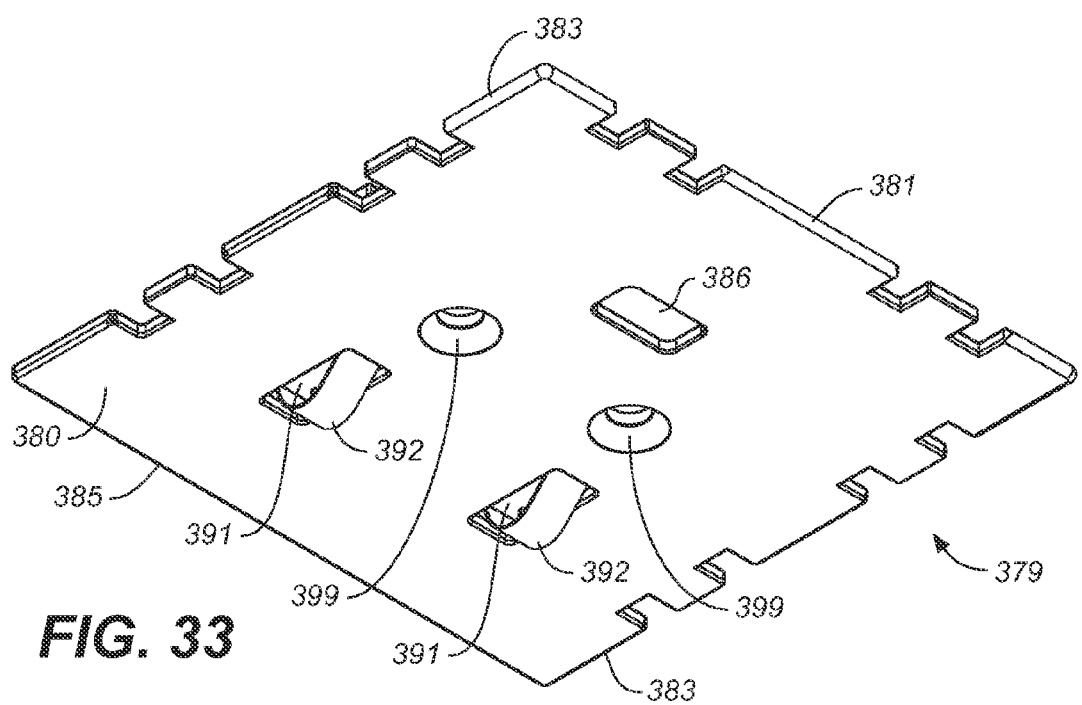
FIG. 33 is a side elevational view thereof.

An example of an adaptor that can be used to attach the OLED loaded cassette, such as shown in FIGS. 16-27, to wire containing mounting structures, such as rails or the like, is illustrated in FIGS. 31-33. Here, the adaptor, denoted 379, is in the form of a flat mounting plate 380 having a back perimeter edge 381, side perimeter edges 383 and a front perimeter edge 385, and is sized to slide into the pocket 361 of the on the top side of the cassette's base plate 329 through its open end 362. When fully installed, the side perimeter edge of the adaptor is retained by the turned-in side capture walls 367, 369 of the pocket's side rails 357, and the back perimeter edge is retained by the turned-in back capture wall 359; the adaptor is locked in place as a consequence of the spring tab 371 on the cassette's base plate snapping into an opening provided in the adaptor plate, such as opening 386. Notches, such as notches 387, can be provided in the side and back perimeter edges of the adaptor plate to reduce friction between the adaptor plate and the engaged edge surfaces of the cassette.

The adaptor 379 makes electrical connection with the surface electrodes of the OLED loaded into the cassette by means of electrical contacts provided in the adaptor, such as conductive spring contacts 392 mounted to riser posts 393, which has a projecting portion that projects through spring contact openings 391 in the adaptor plate. The adaptor plate openings are located in the adaptor plate in correspondence with electrical connection throughways in the cassette's base plate, such as electrode throughways 373. The adaptor plate, which is fabricated of an insulator material, such as PVC plastic, can have wire organizing channels 397 in a raised boss 397, through which wires from wire containing mounting rails or the like can be threaded for connection to the spring contacts 392. Attachment of the adaptor plate to the mounting rails or other wire containing mounting structure can be achieved by mounting screws inserted through screw holes 399, or by any other suitable attachment means.

In this embodiment, electrical contact can be made with the surface electrodes on the back of the OLED just described through electrode throughways in the cassette's base plate. In the illustrated embodiment, two pairs of electrode throughways 373, 375 are provided for use with OLED panels having different surface electrode configurations.

While various aspects of the configurable ceiling lighting system of the invention have been described herein in considerable detail, it is not intended that the invention, or any aspect of the invention, be limited to such detail, except as may be necessitated by the following claims.

What we claim is:

1. A loadable cassette for holding a planar light source so that the planar light source can be operatively connected to a luminaire or lighting system having one or more cassette connector structures, the loadable cassette comprising:

a base plate having a first side and a second side;
a light source retention means associated with the first side of said planar base plate for releasably retaining a planar light source on said first side;
a low profile slide-in retention means associated with the second side of said base plate, said low profile slide-in retention means being in the form of a slide pocket configured to slidably receive a substantially flat low profile cassette connector structure of a luminaire or lighting system in a slide motion that is substantially parallel to the base plate of the cassette; and
spring means on said base plate which releasably engage the substantially flat low profile cassette connector structure of a luminaire or lighting system when substantially fully engaged in said slide pocket, said spring means acting to releasably lock the connector structure of the luminaire or lighting system in said slide pocket.

2. The loadable cassette of claim 1 wherein the light source retention means is at least in part integrally formed on the first side of said base plate.

3. The loadable cassette of claim 1 wherein said spring means is provided in the form of a spring tab in said base plate which depressibly projects into the slide pocket on the second side thereof for snapping into a correspondingly located spring tab slot in the cassette connector structure of the luminaire or lighting system when such connector structure is substantially fully engaged in said slide pocket.

4. The loadable cassette of claim 1 wherein said base plate has electrical connection throughways through which an electrical connection can be made to the planar light source retained on the first side of the base plate from the second side of the base plate.

5. The loadable cassette of claim 1 wherein said base plate is configured to receive the planar light source to be held in the cassette.

6. The loadable cassette of claim 1 wherein the planar light source retention means defines an opening through which the light emitting surface of the planar light source can be viewed.

7. The loadable cassette of claim 6 wherein the opening of the planar light source retention means is of a predetermined size.

8. The loadable cassette of claim 1 wherein the light source retention means is provided in the form of a separate capture ring that releasably attaches to the base plate over the planar light source so as to retain the planar light source against the first side of the base plate.

9. The loadable cassette of claim 8 wherein said capture ring has vertical ring walls and an inwardly turned lip at the bottom of said ring walls for contacting the perimeter edges of the planar light source.

10. The loadable cassette of claim 9 wherein the inwardly turned lip at the bottom of the capture ring's vertical ring walls is angled slightly upwardly toward the base plate to achieve positive contact between the end of the lip and the planar light source held by the cassette.

11. The loadable cassette of claim 3 wherein said capture ring has seating surfaces located to provide a positive stop when the capture ring is engaged against the base plate, and wherein the positive stop provides for a snug fit between the base plate and capture ring and prevents the capture ring from damaging the planar light source held by the cassette.

12. The loadable cassette of claim 11 wherein said capture ring has defined corners and wherein said seating surfaces are located in the corners of the capture ring.

13. A loadable cassette for holding a planar light source so that the planar light source can be operatively connected to a luminaire or lighting system having one or more extending cassette holding arms, the loadable cassette comprising:
a substantially planar base plate having a first side and a second side, and being sized in correspondence with the planar light source to be held in the cassette;
a low profile light source retention means associated with the first side of said base plate for releasably retaining a planar light source to said first side, said light source retention means lying in a plane that is substantially parallel to said base plate;
a low profile slide-in retention means on the second side of said base plate, said slide-in retention means being in the form of a slide pocket configured to slidably receive a substantially flat cassette holding arm of a luminaire or lighting system in a slide motion that is substantially parallel to the substantially planar base plate of the cassette; and
spring means on said base plate which releasably engage the substantially flat low profile cassette connector structure of a luminaire or lighting system when substantially fully engaged in said slide pocket, said spring means acting to releasably lock the connector structure of the luminaire or lighting system in said slide pocket.

14. The loadable cassette of claim 13 wherein the low profile slide-in retention means on the second side of said base plate is adapted to receive and hold a low profile adaptor for operatively interconnecting the cassette and the planar light source held therein to a luminaire or lighting system.

15. The loadable cassette of claim 13 wherein said base plate has electrical connection throughways through which an electrical connection can be made to the planar light source retained on the first side of the base plate from the second side of the base plate.

16. The loadable cassette of claim 13 wherein the planar light source retention means is at least in part integrally formed on the first side of said base plate.

17. The loadable cassette of claim 13 wherein the light source retention means on the first side of said base plate is provided in the form of a low profile capture ring that snap fits onto the base plate over the planar light source so as to retain the planar light source against the first side of the base plate.

18. The loadable cassette of claim 13 wherein the low profile slide-in retention means on the second side of said base plate is adapted to slidably receive and hold a low profile cassette holding arm of a luminaire or lighting system at or close to a zero degree angle relative to the plane of said base plate.

19. The loadable cassette of claim 18 wherein the low profile slide-in retention means on the second side of said base plate is comprised of a slide pocket for slidably receiving the cassette holding arm of a luminaire or lighting system substantially in the plane of the cassette.

20. A loadable cassette for holding a planar light source so that the planar light source can be operatively connected to a luminaire or lighting system having one or more low profile cassette connector structures, the loadable cassette comprising:
a substantially planar base plate having a first side and a second side, and being sized in correspondence with the planar light source to be held in the cassette;
a low profile capture ring adapted to snap fit onto the first side of the base plate over a planar light source so as to retain the planar light source against the first side of the base plate; and a low profile slide pocket on the second side of said base plate for slidably receiving a substantially flat low profile cassette connector structure of a luminaire or lighting system;

said substantially planar base plate having electrical connection throughways through which an electrical connection can be made from the second side of the base plate to the planar light source retained on the first side of the base plate by said capture ring, and further having spring means which releasably engage the substantially flat low profile cassette connector structure of a luminaire or lighting system when substantially fully engaged in said slide pocket, said spring means acting to releasably lock the connector structure of the luminaire or lighting system in said slide pocket.

21. The loadable cassette of claim 20 wherein said capture ring has vertical ring walls and an inwardly turned lip at the bottom of said ring walls for contacting the perimeter areas of the planar light source.

22. The loadable cassette of claim 21 wherein the inwardly turned lip at the bottom of the capture ring's vertical ring walls is angled slightly upwardly toward the base plate to achieve positive contact between the end of the lip and the planar light source held by the cassette.

23. The loadable cassette of claim 20 wherein said capture ring has seating surfaces located to provide a positive stop when the capture ring is engaged against the base plate, and wherein the positive stop provides for a snug fit between the base plate and capture ring and prevents the capture ring from damaging the planar light source held by the cassette.

24. The loadable cassette of claim 23 wherein said capture ring has defined corners and said seating surfaces are located in the corners of the capture ring.

25. The loadable cassette of claim 20 wherein the cassette holds a planar light source having a back non-light emitting side and surface electrodes on such back non-light emitting side, and wherein the low profile slide pocket on the second side of said base plate is formed to releasably receive and hold an adaptor having electrical contacts therein that contact the surface electrodes of the planar light source through the electrical connection throughways in said base plate when the adaptor is fully engaged in said low profile slide pocket.

26. The loadable cassette of claim 25 wherein the low profile slide pocket on the second side of said base plate is formed to slidably and releasably receive the adaptor at low or in-plane attachment angles relative to the plane of said base plate.

* * * * *